United States Patent [19]
Tomitaka et al.

[11] Patent Number: 5,812,193
[45] Date of Patent: Sep. 22, 1998

[54] VIDEO CAMERA SYSTEM WHICH AUTOMATICALLY FOLLOWS SUBJECT CHANGES

[75] Inventors: Tadafusa Tomitaka, Chiba; Takayuki Sasaki, Kanagawa, both of Japan

[73] Assignee: Sony Corporation, Tokyo, Japan

[21] Appl. No.: 763,426

[22] Filed: Dec. 11, 1996

Related U.S. Application Data

[63] Continuation of Ser. No. 148,782, Nov. 5, 1993, abandoned.

[30] Foreign Application Priority Data

Nov. 7, 1992 [JP] Japan .................................. 4-322652
Nov. 7, 1992 [JP] Japan .................................. 4-322655

[51] Int. Cl.$^6$ .................................................. H04N 5/225
[52] U.S. Cl. ............................................. 348/369; 348/169
[58] Field of Search ................................. 348/207, 208, 348/143, 155, 169, 170, 171, 172, 362, 364, 649, 652, 700, 703, 345, 352, 347, 369, 14, 15; 382/173, 115, 191

[56] References Cited

U.S. PATENT DOCUMENTS

| | | | |
|---|---|---|---|
| 4,987,482 | 1/1991 | Imai et al. | 348/652 |
| 5,012,522 | 4/1991 | Lambert | 348/143 |
| 5,196,929 | 3/1993 | Miyasaka | 348/169 |
| 5,355,163 | 10/1994 | Tomitaka | 348/234 |
| 5,430,809 | 7/1995 | Tomikata | 382/173 |

FOREIGN PATENT DOCUMENTS 2-140073  5/1990  Japan ............................. H04N 5/232

*Primary Examiner*—Andrew Faile
*Assistant Examiner*—Tuan V. Ho
*Attorney, Agent, or Firm*—Harold T. Fujii; Jerry A. Miller

[57] ABSTRACT

A video camera system can suitably track a moving object without influence of other objects outside the desired image. Detection feature patterns are formed after brightness and hue frequency feature data are obtained on the basis of image information of the detection measurement frame. The position of detection measurement frame having a feature pattern with the largest similarity to the standard feature pattern obtained from the standard measurement frame is determined. An imaging condition of a television camera is controlled on the basis of the position information of the detection measurement frame in order to attain a video camera system enabling to suitably track the object motion. Further, a video camera system can obtain a face image of constantly a same size with a simple construction. An area of the face image on the display plane is detected as the detected face area, and by comparing this with a standard face area, zooming-processing is performed such that the difference becomes 0. Thus, it is unnecessary to use the method of a distance sensor, etc., and a video camera system with a simple construction can be obtained.

22 Claims, 22 Drawing Sheets

VIDEO CAMERA SYSTEM WHICH AUTOMATICALLY FOLLOWS SUBJECT CHANGES

This is a continuation of application Ser. No. 08/148,782 filed on Nov 5, 1993, abandoned, which is hereby incorporated by reference.

BACKGROUND

1. Field of the Invention

This invention relates to a video camera system, and more particularly to an improvement of a video camera system adapted to automatically follow changes of the object seen in the visual field of the video camera in order to provide a suitable and preferable image. Further, this invention is more particularly related to an improvement of a video camera system, wherein the human face can be imaged with approximately the same size.

2. Background of the Invention

Nowadays, a single-lens reflex camera having an automatic zooming function has been used. Such camera has a CCD (charge coupled device) line sensor determining a correct distance between the object and the camera to drive a zoom motor.

According to the automatic zooming camera system of the conventional single-lens reflex camera, it is adapted to restrict the object to be shot to adult persons, a camera user previously selects one of a face-up shot, bust shot, and full body shot by pushing buttons, and the zoom motor is driven according to the position of the zoom lens after the particular position of the zoom lens corresponding to the distance between the lens position and the object, which distance being previously programmed according to the particular kind of the shot, is determined.

Because such single-lens reflex camera provides a CCD line sensor for automatic focusing, the CCD line sensor can judge whether the object is in front of or behind the focus and the distance to the object can be correctly determined, it is possible to obtain or construct an auto-zooming system relatively easily.

In addition, there have been automatic tracking apparatus which are adapted to automatically track or follow the movement of the object in the visual field of the video camera. A conventional object tracking apparatus provided in the video camera memorizes a peak value of a high-frequency part of a brightness signal in the measurement frame and recognizes the motion of the object as its characteristic.

According to another conventional automatic object tracking apparatus of the video camera, a matching of representative points of luminance signals in two successive fields within the measurement frame is taken so as to form a motion vector, and a motion of the object supposed by the motion vector in the measurement frame is automatically tracked.

The conventional automatic zooming systems of the single-lens reflex camera fail to be employed in the video camera having an automatic focusing system of the so-called mountain-climbing control type, since the conventional automatic zooming systems can not correctly measure the distance to the object.

The former object automatic tracking apparatus has a merit of simple structure of the whole mechanism. However, it has a problem of failing to track an object of a man when, for example, there are trees in the background within the measurement frame as well as the man. The reason of such problem resides in that the high frequency component of the tree becomes the largest peak.

The latter or second automatic tracking method basically uses signals output when the peak occurs, so that the method is sensitive to noise resulting in malfunction of the automatic tracking apparatus in a photographing environment with low brightness. Theoretically, since the second conventional automatic tracking method picks up the high frequency component, it tends to fail to automatically track the objects with low contrast.

Furthermore, the second tracking method can not or has difficulty judging whether the calculated motion vector is due to the shaking hands of a user holding the video camera, or, due to moving of the object, resulting in the erroneous operation of the video camera or the tracking apparatus therein.

SUMMARY OF THE INVENTION

In view of the foregoing, an object of this invention is to provide a video camera system which can stably and effectively pick up a characteristic value of the object in the view field or display in order to automatically track the motion of the object simply and surely.

Another object of this invention is to provide a video camera system which obtains a face image which is almost constantly the same size when the human being as an object comes closer or moves away from the camera.

The foregoing objects and other objects of this invention have been achieved by the provision of a video camera system, comprising picture element information forming means (1, 5, 6, and 7) for forming picture elements constructing display plane PIC on the basis of an imaging output signal of the object to be imaged, standard measurement frame setting means (16, 17, 15 and SP3) for setting standard measurement frame FMXR of a predetermined size at a predetermined position on the display plane PIC; detection measurement frame setting means (16, 17, 15, and SP3) for setting detection setting frames (FMX1 to FMX3, and FMXD) of a predetermined size on the display plane PIC; a standard frequency characteristic data forming means (19, 20, and 16) for forming standard frequency characteristic data YStd(i), HueStd(i) of hue angle and/or brightness level on the basis of brightness information and/or hue information of the image within the standard measurement frame FMXR; detection frequency characteristic data forming means (19, 20, and 16) for forming detection frequency characteristic data YSmall(i), HueSmall(i), Y(x, y), (i), hue(x, y)(i) of brightness and/or hue angle on the basis of brightness information and/or hue information of the image within the detection measurement frame (FMX1 to FMX3, and FMXD); detection measurement frame fixing means (16, SP5, and SP15) for determining a similarity of the standard frequency characteristic data and/or detection frequency characteristic data in order to fix the detection measurement frame having detection frequency characteristic data of a large similarity; and picture element information change control means (16, SP6, and SP16) for driving and controlling the picture element information forming means (1, 5, 6, and 7) so as to enter image information of the determined or fixed detection measurement frame into the standard measurement frame.

Another object of this invention has been achieved by the provision of a video camera system, comprising: input image forming means (31, 35, 36, 37, 43, 44, 46, and 47) for forming image data of an input image to show the face model of an object from image light LA; face area extracting means (45 and SP22) for extracting a face area (HR1 and FC1) from the image data of the input image; detected face area computing means (45 and SP23) for computing the area of face area extracted (HR1 and FC1); standard face area memorizing means (45 and SP24) for memorizing the size of standard face area; deviation detecting means (45 and SP25) for obtaining deviation between the standard face area to be obtained from the standard face area memorizing means (45 and SP24); and input image zooming means (45, 42 and SP25) for zooming in order that the size of input image to be formed in the input image forming means (31, 35, 36, 37, 43, 46, and 47) based on the deviation output of the deviation detecting means (45 and SP25) becomes 0 deviation.

According to the operation of the video camera system of this invention, the picture element information within the standard measurement frame FMXR of the picture element information of the object is changed to the standard frequency characteristic data YStd(i) and HueStd(i) concerning brightness level and/or hue angle by means of the standard frequency characteristic data forming means (19, 20, and 16), and the picture element information within the detection measurement frames (FMX1 to FMX3, and FMXD) is converted into the detection frequency characteristic data YSmall(i), HueSmall (i), Y(x, y) (i), and Hue (x, y) (i) concerning the brightness level or hue angle by means of the detection frequency characteristic data forming means (19, 20, and 16). The detection frequency characteristic data having a large similarity concerning the standard frequency characteristic data are determined by the detection measurement frame fixing means (16, SP5, and SP15) and the picture element information forming means (1, 5, 6, and 7) are driven and controlled by the picture element information changing controlling means (16, SP6, and SP16) so as to enter the picture element information within the determined detection measurement frame.

Thus, the video camera system of this invention can automatically track and control the object so as to enter in the standard frame of the display plane, by using frequency characteristic data and expressing the characteristic of the image. Consequently, the video camera system can be formed without difficulty.

According to this invention, a position of the detection measurement frame having a large similarity on the basis of the frequency characteristic data concerning the brightness information and hue information in the predetermined measurement frame is measured in order to control the imaging condition of the video camera on the object. Consequently, it is easy to provide a video camera system enabling surely and suitably to operate and match any change of the object relative to the video camera.

Further, the input image zooming means (45 and SP25) zooms in order that the deviation between the standard face area to be obtained from the detected face area memorizing means (45 and SP24), and the detected face area to be obtained from the standard face area memorizing means (45 and SP24) becomes 0. As a result, the size of detected face image will be zoom controlled to conform approximately to the size of the standard face image.

In addition, according to this invention, since the area of the face image to be imaged on the display screen is calculated and zooming-processed by comparing said detected face area with the standard face area in order that the difference becomes 0, a video camera system which is capable of imaging the face image which holds the same size constantly with a simpler construction can be easily obtained.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
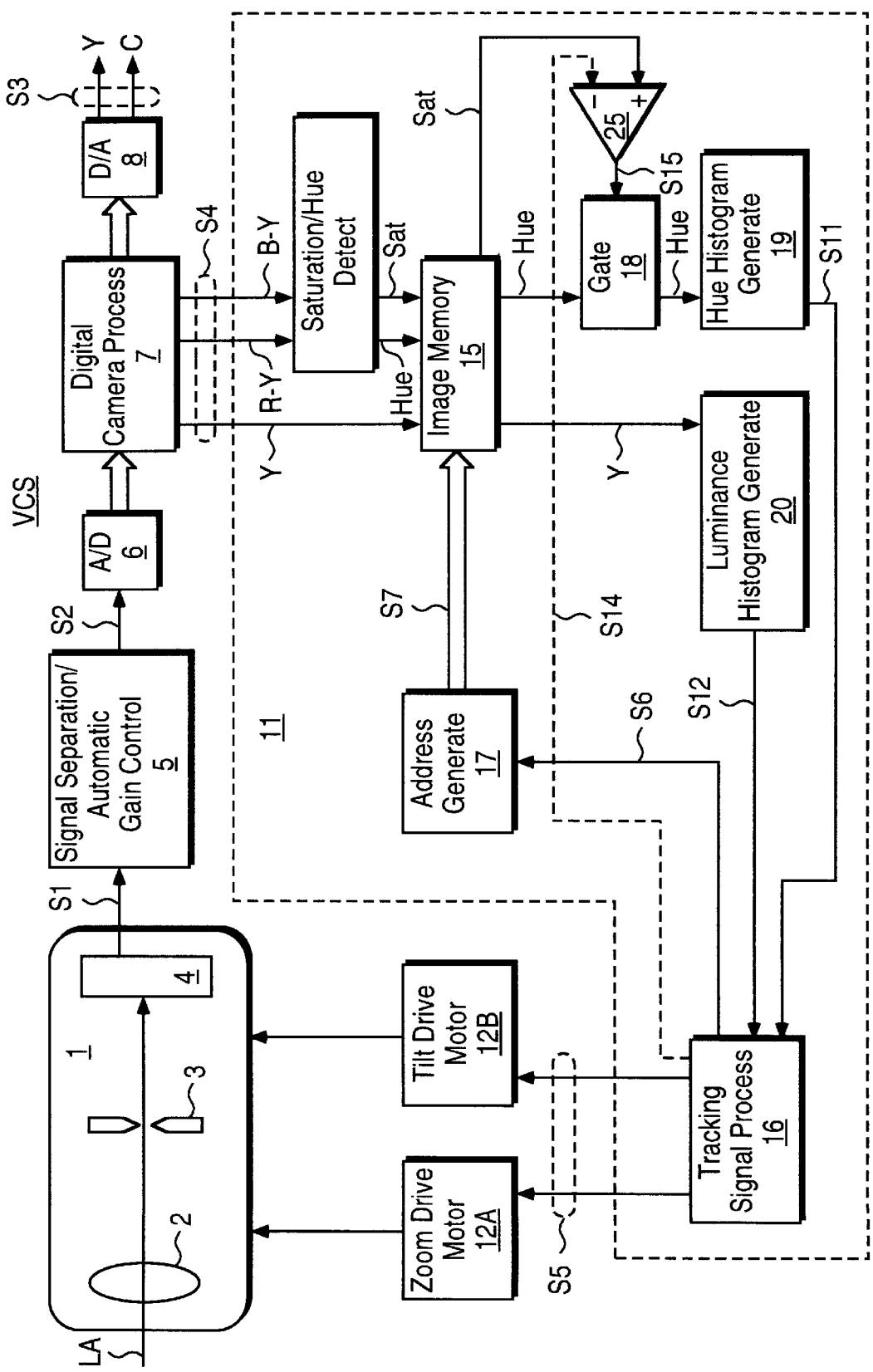
FIG. 1 is a block diagram showing the first embodiment of the video camera system according to this invention.

While this invention is susceptible of embodiments in many different forms, there are shown in the drawings, and will herein be described in detail, specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Preferred embodiments of this invention will be described with reference to the accompanying drawings:

(1) First Embodiment

In FIG. 1, VCS denotes generally a construction of the video camera system in which an imaging light LA, from the object whose image is to be taken, is received by a solid-state imaging element 4 consisting of, for example, a CCD (charge coupled device) after passing through a lens 2 and an iris 3 in a lens block portion 1, and imaging output signal S1 expressing the image of object is given to a signal separation/automatic gain control circuit portion 5.

The signal separation/automatic gain control circuit portion 5 samples and holds the imaging output signal S1 and controls the control signal from an automatic iris (AE, not shown) so as to make the imaging output signal S1 have a predetermined gain. The thus obtained camera output signal S2 is supplied to a digital camera processing circuit 7 through an analog/digital conversion circuit portion 6.

The digital camera processing circuit 7 forms brightness signal Y and chroma signal C on the basis of the camera output signal S2 and sends out the brightness signal Y and chroma signal C as video signals through a digital/analog conversion circuit 8.

In addition, the digital camera processing circuit 7 supplies brightness signals Y and color difference signals R-Y and B-Y of object tracking detection signal S4 to a tracking control circuit portion 11. The tracking control circuit portion 11 outputs tracking control signals S5 to a zooming drive motor 12A and tilting drive motor 12B used for the lens block portion 1 on the basis of the object tracking detection signal S4.

The tracking control circuit portion 11 provides color difference signals R-Y and B-Y to a saturation level/hue detection circuit 14 in order to form hue signal HUE and saturation signal SAT and memorizes the signals HUE and SAT together with brightness signal Y in an image memory 15 consisting of, for example, a field memory at an unit of picture element.

The saturation level/hue detection circuit 14 converts color difference signals R-Y and B-Y from orthogonal coordinates to curvilinear coordinates to form hue signal HUE and saturation level signal SAT, thereby recognizing the object on the basis of sight stimulation for making the man perceive the object through brightness signal Y, hue signal HUE, and saturation level signal SAT.

Figure 2:
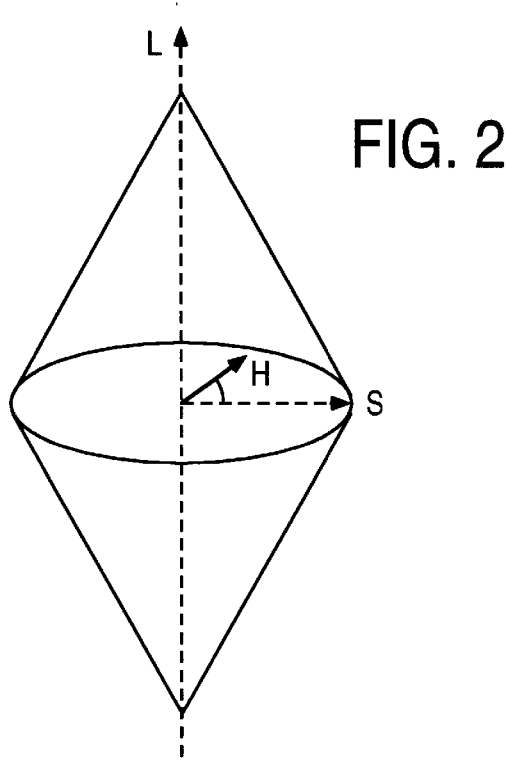
FIG. 2 is a schematic diagram explaining HLS color coordinates expressing sight stimulus.

By the way, in general, the sight stimulation which the man perceives can be shown in FIG. 2 and expressed by color coordinates system provided with L axis and SH plane perpendicular to the L axis forming the so called as HLS system.

The L axis depicts a brightness corresponding to the brightness signal Y. The SH axis is expressed by curvilinear coordinates perpendicular to L axis plane. On the SH plane, S shows a saturation and expressed by the distance from the L axis. H shows a hue and is expressed by an angle measured from the direction of color difference signal R-Y of 0 degree.

All colors of the solid body shown by the HLS system become white when the light source becomes bright, or the SH plane or color coordinates rises along the L axis. During such rising of the color coordinates, saturation level S lessens. On the contrary, when the light source diminishes in its brightness, the color coordinates or SH plane lowers along the L axis and all colors becomes black, and the saturation level S decreases.

According to the features of such HLS color coordinates, the saturation level S and brightness Y are easily influenced by brightness of the light source, so that it is difficult to say that these saturation level and brightness are good parameters expressing characteristic value of the object. On the contrary, it is apparent that a hue H expressing the characteristic value particular to the object is difficult to be influenced by the light source.

However, when the color of the object resides near the L axis or the color is white, black or gray, the hue signal H fails to have meaningful information and, at the worst case of the image having bad ratio of S/N, the white color appeared on the image may have vectors of various hues H.

In order to solve this problem, the tracking control circuit portion 11 of this embodiment uses the features of such HLS color coordinates. The tracking control circuit portion 11 picks up the characteristics or features of the object and drives the zooming drive motor 12A and the tilting drive motor 12B so as to track the changing object when its feature changes resulting in an obtaining of video signals S3 zooming-processed to suitably track the moving object.

Figure 3:
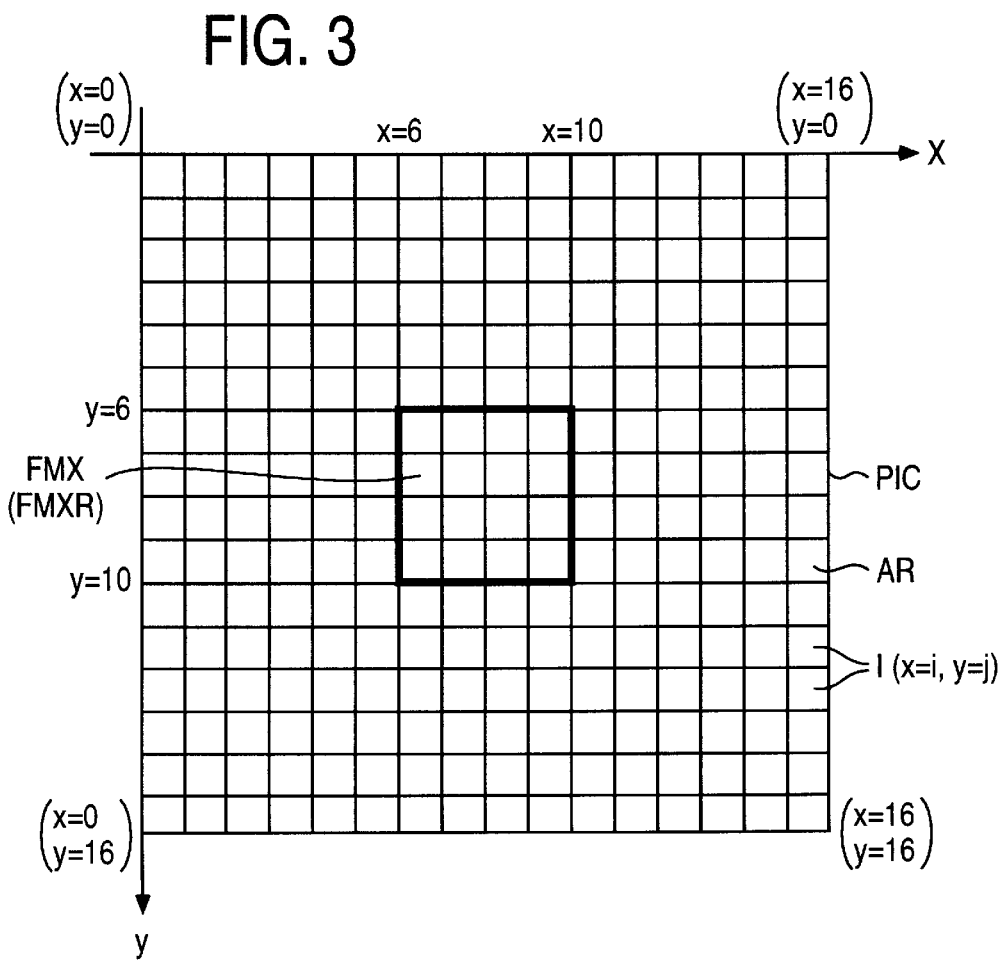
FIG. 3 is a schematic diagram explaining the standard measurement frame FMR.

That is, the picture element information constructing the object tracking detection signal S4 memorized in the image memory 15 is divided by means of an address signal S7 supplied from an address generation circuit 17 which generates the address signal S7 based on a block designating signal S6 sent from a tracking signal processing circuit 16 having a micro processor, so as to divide as shown in FIG. 3, the display plane PIC formed substantially within the image memory 15 into the block consisting of the predetermined sized unit regions AR on the basis of the XY rectangular coordinates (x, y).

As described above, data of each picture element consisting of the display plane PIC of the image memory 15 are read out at every unit region and processed as one block of image information at every unit region AR.

According to this embodiment of the video camera system, as shown in FIG. 3, the picture plane PIC is divided respectively to sixteen (16) unit regions AR along x direction and y direction. Consequently, designating the coordinates x=i, y=j (for example, the coordinates at the upper left corner) of the perpendicular or orthogonal coordinates (x, y) concerning the unit region AR of 16×16 (=256) pieces can read out the image information I (x=i, y=j) of the appointed unit region AR.

As described above, the hue signal HUE component of the image information I (x=i, y=j) read out for every unit region AR from the image memory 15 is given to a hue histogram generation circuit 19 through a gate circuit 18. On the contrary, the brightness signal Y component is directly given to a brightness histogram generation circuit 20.

Figure 4:
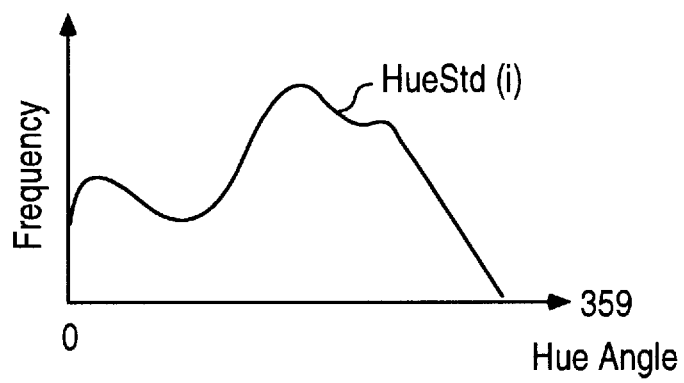
FIG. 4 is a characteristic curve diagram showing standard hue frequency characteristic obtained from the standard measurement frame FMXR.

The hue histogram generation circuit 19 determines hue frequency characteristic HueStd(i) expressing the number of the picture elements having respective hue angle of the hue angles 0° to 359° concerning the hue of the picture elements within the measurement frame FMX set on the picture plane PIC as shown in FIG. 4, and sends these hue frequency characteristic HueStd(i) to the tracking signal processing circuit 16 as hue histogram signal S11.

In other words, the hue histogram generation circuit 19 converts the features of hue of the image in the measurement frame FMX into the hue feature pattern expressed by the hue frequency characteristic HueStd(i).

Figure 5:
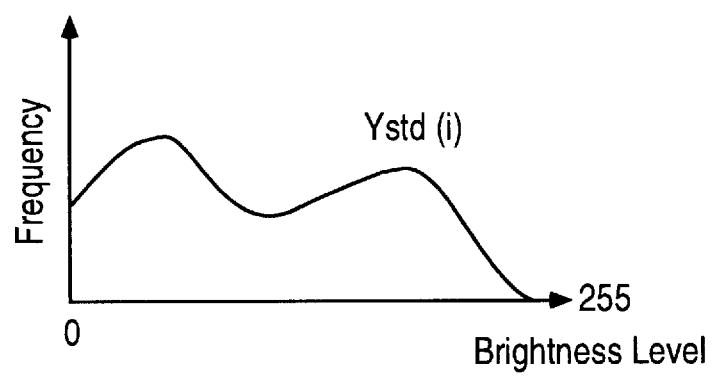
FIG. 5 is a characteristic curve diagram showing standard brightness frequency characteristic obtained from the standard measurement frame FMXR.

Similarly, the brightness histogram generation circuit 20 determines, as shown in FIG. 5, brightness frequency characteristic YStd(i) expressing the number of the picture elements having respective brightness levels of the brightness levels 0 to 255 on the basis of the brightness signal Y concerning the picture elements within the measurement frame FMX set on the display plane PIC, and supplies these brightness frequency characteristic YStd(i) to the tracking signal processing circuit 16 as the brightness histogram signal S12.

As a result, the brightness histogram generation circuit 20 converts the feature of the brightness of the image within the measurement frame FMX to the brightness feature pattern expressed by the brightness frequency characteristic YStd(i) and supplies the pattern to the tracking signal processing circuit 16.

According to this embodiment of the video camera system, it has a hue noise gate signal generation circuit 25 having a comparator corresponding to a gate circuit 18 in order to compare a saturation signal SAT read out every picture element from the image memory 15, with a noise judge signal S14 given by the tracking signal processing circuit 16. When the saturation signal SAT is less than the predetermined level, a gate signal S15 for closing the gate circuit 18 is given to the gate circuit 18 preventing the hue signal HUE for the particular picture element from inputting to the hue histogram generation circuit 19.

In this connection, when the saturation signal SAT detected in the saturation/hue detection circuit 14 resides near the L axis (FIG. 2), the hue signal HUE of the saturation signal SAT may have a little saturation being hidden in or buried in noise failing to have meaningful information, so such hue signal HUE is removed from the gate circuit 18.

Figure 6:
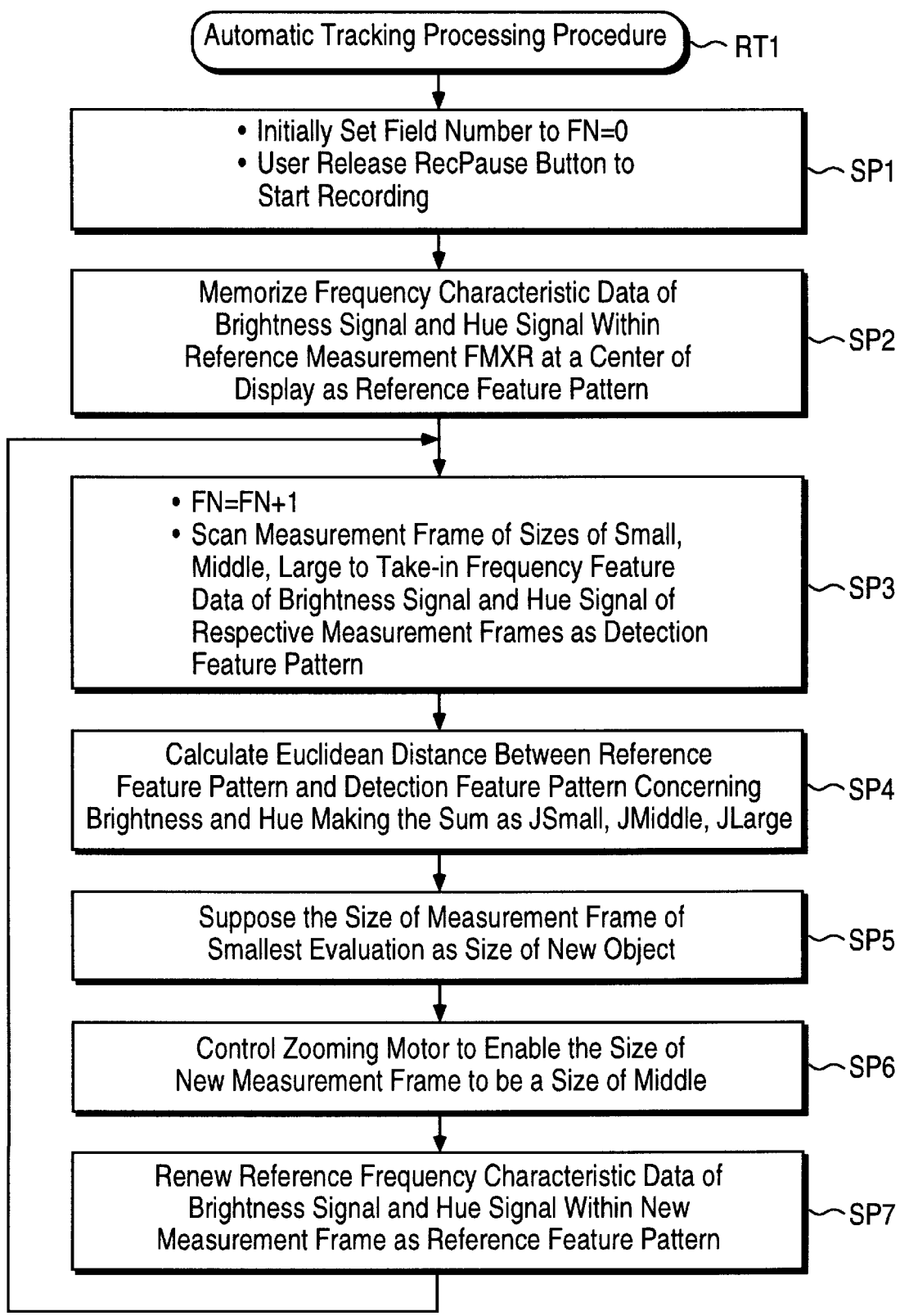
FIG. 6 is a flowchart showing an automatic tracking processing procedure according to the first embodiment.
Figure 7:
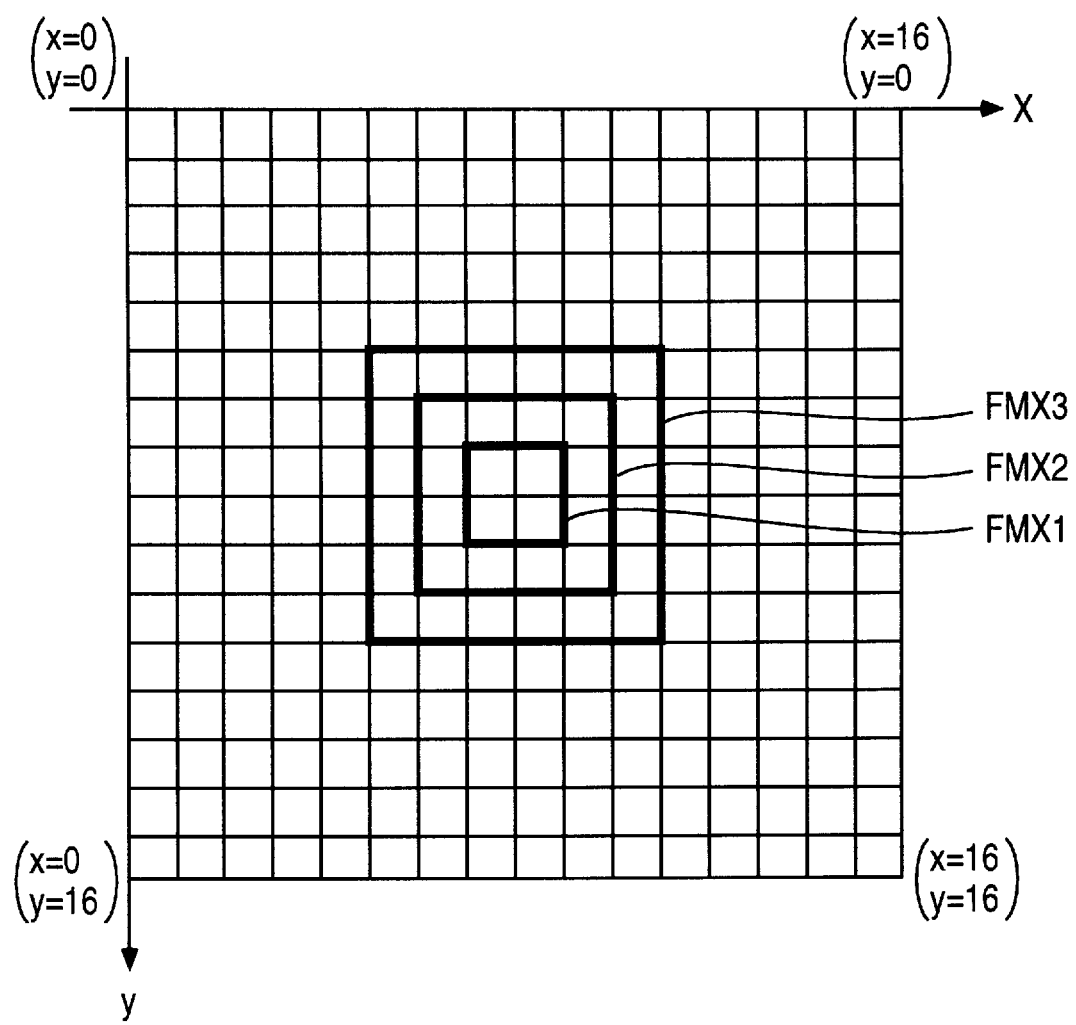
FIG. 7 is a schematic diagram illustrating a detection measurement frame.

According to the construction of the video camera system, the tracking signal processing circuit 16 operates according to the manipulation of the user and carries out an automatic tracking processing procedure RT1 shown in FIG. 6. As a result the, brightness feature pattern and the hue feature pattern are formed in the brightness histogram generation circuit 20 and the hue histogram generation circuit 19 on the basis of the brightness signal Y and hue signal HUE of respective picture elements taken in the image memory 15 and thereby the zooming operation of the lens block 1 is controlled at the most effective condition.

When the tracking signal processing circuit 16 enters the automatic tracking processing procedure RT1 shown in FIG. 6, a field number FN is initially set to FN=0 in a step SP1, the user of the video camera releases a record pause button RECPAUSE waiting for a start of recording operation.

Then, the user starts the record, the tracking signal processing circuit 16 proceeds to a step SP2, in which step frequency feature (or histogram) of the brightness signal Y and hue signal HUE or brightness frequency characteristic YStd(i) (FIG. 5) and hue frequency characteristic HueStd(i) (FIG. 4) within the standard measurement frame FMXR (in this embodiment, this is selected to an unit regions of 4×4 pieces) set at the central position of the display as shown in FIG. 3 are taken from the brightness histogram generation circuit 20 and hue histogram generation circuit 19 as, respectively, a standard brightness frequency feature and standard hue frequency feature. These features above are memorized as "standard feature pattern".

Then, the tracking signal processing circuit 16 proceeds to step SP3 and the field number FN is incremented to FN+1, then the measurement frame FMX sequentially is changed to a plurality of measurement frames FMX1, FMX2, and FMX3, respectively having different sizes, as well as the brightness frequency characteristic YStd(i) and hue frequency characteristic HueStd(i) concerning respective measurement frame FMX1, FMX2, and FMX3 are taken from the brightness histogram generation circuit 20 and hue histogram generation circuit 19.

In this embodiment of this invention, a plurality of measurement frames are selected such as a small measurement frame FMX1 consisting of small regions having unit regions AR of 2×2 pieces, a middle measurement frame FMX2 consisting of middle regions having unit regions AR of 4×4 pieces, and a large measurement frame FMX3 consisting of a large region having unit regions AR of 6×6 pieces. "Detection feature patterns" of detection brightness and detection hue frequency characteristic YSmall(i) and HueSmall(i), YMiddle(i), and HueMiddle(i), and YLarge(i), HueLarge(i) are taken from respective measurement frames FMX1, FMX2, and FMX3.

Continuously, the tracking signal processing circuit 16, in the step SP4, determines Euclidean distance between the standard feature pattern and detection feature pattern concerning brightness and hue, and the sums of them are determined as valuation values JSmall, JMiddle, and JLarge.

Figure 9:
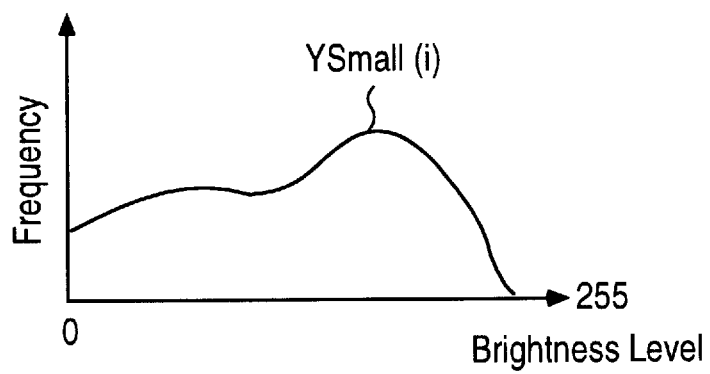
FIG. 9 is a characteristic curve diagram showing detection brightness frequency characteristic.

In the other words, the tracking signal processing circuit 16 calculates using the brightness information of the small measurement frame FMX1, as shown in the following equation (1):

$$J1\text{Small} = \sum_{i=0}^{255} |Y\text{small}(i)/4 - Y\text{std}(i)/16| \qquad (1)$$

the detection brightness frequency characteristic YSmall (i)/4 which is normalized as a mean value of unit regions AR (FIG. 9), the standard frequency characteristic YStd(i)/16 (FIG. 5) which is normalized as a mean value of unit regions AR. The absolute values of the difference between the detection brightness frequency characteristic YSmall(i)/4 and the standard frequency characteristic YStd(i)/16 concerning all the brightness levels i=0 to 255 are added obtaining a total value which is a small measurement frame brightness Euclidean distance J1Small expressing a similarity between the image brightness information of the small measurement frame FMX1 and the brightness information of the standard measurement frame FMXR.

Similarly, the tracking signal processing circuit 16 determines, using hue information of the small measurement frame FMX1 as shown in the following equation (2):

$$J2Small = \sum_{i=0}^{359} |HueSmall(i)/4 - HueStd(i)/16| \quad (2)$$

Figure 8:
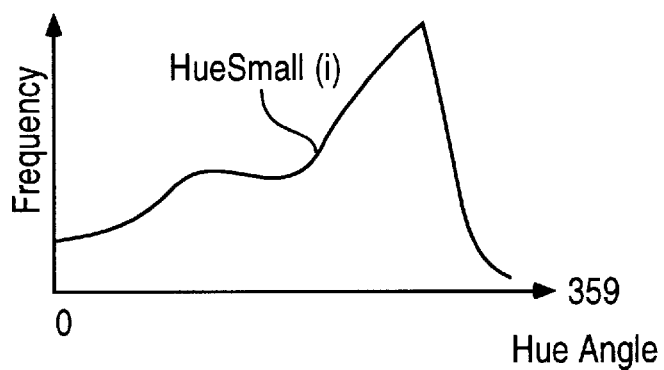
FIG. 8 is a characteristic curve diagram showing a detection hue frequency characteristic.

HueSmall(i)/4 normalized as a mean value of small regions AR (FIG. 8) and HueStd(i)/16 normalized as a mean value of a small regions AR (FIG. 4). The absolute values of the difference between the HueSmall(i)/4 and HueStd(i)/16 concerning all hue angles 0° to 359° are totaled so as to obtain a small measurement frame hue Euclidean distance J2Small expressing the similarity between the image hue information of the small measurement frame FMX1 and the hue information of the standard measurement frame FMXR.

Similarly, the tracking signal processing circuit 16 unit determines, using the brightness signal of the image within the middle measurement frame FMX2 as described by the following equation (3):

$$J1Middle = \sum_{i=0}^{255} |YMiddle(i)/16 - YStd(I)/16| \quad (3)$$

the normalized standard brightness frequency characteristic YStd(i)/16 and the normalized brightness frequency characteristic YMiddle(i)/16 of the detection brightness frequency characteristic YMiddle(i), the total absolute values of the difference between YStd(i)/16 and YMiddle(i)/16 on all brightness levels I=0 to 255 are determined as a middle measurement frame brightness Euclidean distance J1Middle depicting the similarity between an image brightness information of the measurement frame FMX2 and a brightness information of the standard measurement frame FMXR.

Also, the tracking signal processing circuit 16, using hue information of the image within the middle measurement frame FMX2 as shown by the following equation (4):

$$J2Middle = \sum_{i=0}^{359} |HueMiddle(i)/16 - HueStd(i)/16| \quad (4)$$

determines the total value of the absolute value of the difference between the normalized hue frequency characteristic HueMiddle(i)/16 and the normalized standard hue frequency characteristic HueStd(i)/16 on all hue angles 0° to 359° as a middle measurement frame hue Euclidean distance J2Middle depicting the similarity between the image hue information of the middle measurement frame FMX2 and hue information of the standard measurement frame FMXR.

In addition, the tracking signal processing circuit 16 determines, concerning brightness information of the image within the large measurement frame FMX3 as described in the following equation (5):

$$J1Large = \sum_{i=0}^{255} |YLarge(i)/36 - YStd(i)/16| \quad (5)$$

the total value of all the values of the absolute value of the difference between the normalized detection brightness frequency characteristic YLarge(i)/36 and the normalized standard brightness frequency characteristic YStd(i)/16 on all the brightness levels i=0 to 255, as the large measurement frame brightness Euclidean distance J1Large depicting the similarity between the image brightness information of the large measurement frame FMX3 and the brightness information of the standard measurement frame FMXR.

Also, the tracking signal processing circuit 16 determines, concerning hue information of the image of the large measurement frame as described by the following equation(6):

$$J2Large = \sum_{i=0}^{359} |HueLarge(i)/36 - HueStd(i)/16| \quad (6)$$

the total value of the absolute value on all hue angles 0° to 359° of the difference between the normalized detection hue frequency characteristic HueLarge (i)/36 and the normalized standard hue frequency characteristic HueStd(i)/16, as the large measurement hue Euclidean distance J2Large depicting the similarity between the hue information of the large measurement frame FMX3 and another hue information of the standard measurement frame FMXR.

As a result, the similarity between the image of the small measurement frame FMX1, middle measurement frame FMX2 and large measurement frame FMX3, and another image of the standard measurement frame FMXR can be determined as evaluation values JSmall, JMiddle and JLarge due to the total Euclidean distance of the brightness and hue as described in the following equations (7), (8) and (9):

$$JSmall=J1Small+J2Small \quad (7)$$
$$JMiddle=J1Middle+J2Middle \quad (8)$$
$$JLarge=J1Large+J2Large \quad (9)$$

Continuously, the tracking signal processing circuit 16 searches for the smallest one of the valuation values JSmall, JMiddle, and JLarge on the small measurement frame FMX1, middle measurement frame FMX2, and large measurement frame FMX3, and this smallest one is assumed to be the size of the object at present in the next step SP5.

It is noted that the meaning of becoming the smallest one of the valuation values of JSmall, JMiddle, and JLarge, is that the image information at the previous measurement instant contains image information of the largest similarity among the three measurement frames presently measured, as well as the measurement frame having a largest continuousness between the measurement results at the previous measurement instant and at the present is selected.

The tracking signal processing circuit 16 in the next step SP6 supplies the tracking control signals making the newly selected measurement frame size identical with that of the middle measurement frame FMX2 to the zooming drive motor 12A in order to control and sustain the lens block portion 1 at the condition keeping a continuity of the previous measurement result.

Continuously the tracking signal processing circuit 16 is in the next step SP7, the standard brightness frequency characteristic YStd(i) (FIG. 5) and the standard hue frequency characteristic HueStd(i) (FIG. 4) are taken from the brightness histogram generation circuit 20 and hue histogram generation circuit 19 through the brightness histogram signal S12 and hue histogram signal S11 in order to memorize a new standard feature pattern and, then returns to the previous step SP3 to be entered into a new tracking operation according to the new standard feature pattern.

By the way, in the step SP5, when the small measurement frame FMX1, for example, is selected, the tracking signal processing circuit 16 in the step SP6 drives the zooming drive motor 12A to a narrow side in order to enlarge the image of the small measurement frame FMX1 to the size of the middle measurement frame FMX2.

On the contrary, when the large measurement frame FMX3 is selected in the step SP5, the tracking signal processing circuit 16 drives the zooming drive motor 12A in the step SP6 to the wide side so as to decrease the size of the object image enabling to display the image within the large measurement frame FMX3 in the middle measurement frame FMXR.

On the contrary, when the middle measurement frame FMX2 is selected in the step SP5, the tracking signal processing circuit 16 in the step SP6 does not drive the zooming drive motor 12A to either the wide side or the narrow side, as a result, the size of the image of the object is kept so as to be able to continuously display the image within the middle measurement frame FMX2.

According to the construction of the video camera system described above, when a recording starts after the user initially operates the camera so as to enter the object in the central standard measurement frame FMX of the display and the distance between the video camera and the object increases, the size of the object on the display plane PIC decreases resultantly becoming the content of the detection feature pattern obtained from the small measurement frame FMX1 nearest to the standard feature pattern. As a result, it is necessary to make the tracking signal processing circuit 16 to drive the zooming drive motor 12A to the narrow side and control the size of object in the display plane PIC so as to suit the size of the standard frame FMXR.

On the contrary, when the object moves toward the video camera, the size of object on the display plane PIC increases, so that it is possible to obtain the detection feature pattern nearest to the standard feature pattern of the measurement image information from the large measurement frame FMX3. Then the tracking signal process circuit 16 drives the zooming drive motor 12A to the wide side, thus the size of the object on the display plane PIC is controlled so as to suitably enter the standard measurement frame FMXR.

If the position of the object relative to the camera does not change, the size of the object in the display plane PIC is kept at its size enabling to always enter or contain within the standard measurement frame FMX. As a result, the detection feature pattern obtained from the middle measurement frame FMX2 becomes to have the largest similarity to the standard feature pattern. At this time, if the tracking signal processing circuit 16 is controlled so as to prevent the zooming drive motor 12A from driving, the size of the object in the display plane PIC is entered in the standard measurement frame FMXR.

As described above, it is possible to control a zooming so as to always make the size of the object in the display plane PIC a predetermined one. The frequency features of the picture element number of respective brightness levels and the phase angles in the measurement frame are used as the feature value of the object so that, if the display plane PIC shakes due to the moving hands of the user of the video camera, it is possible to control the zooming operation without the effect of the shaking of the display plane PIC, with a simple construction of the whole video camera system.

Because that the standard feature patterns are adapted to be sequentially changed with the time elapsed, even when the object turns or the object image change (for example, when the object of a man takes off his jacket), it is possible to suitably auto-zoom control the video camera system.

(2) Second Embodiment

Figure 10:
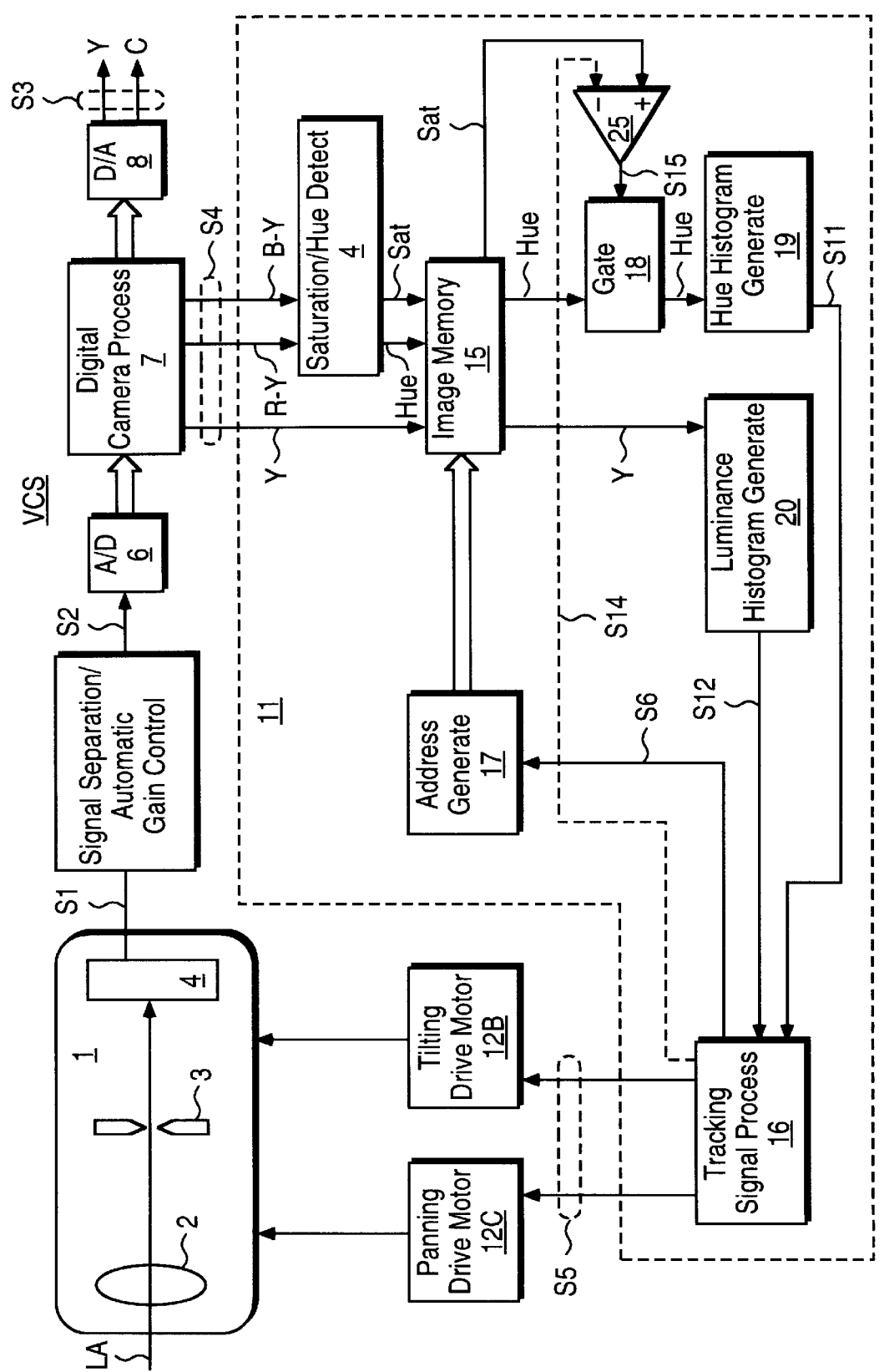
FIG. 10 is a block diagram showing the second embodiment of the video camera system according to this invention.

FIG. 10 shows the second embodiment of the video camera system VCS of this invention. The parts or portions corresponding to that shown in FIG. 1 have the same or corresponding reference numerals. The tracking signal processing circuit 16 is adapted to drive and control the tilting drive motor 12B and a panning drive motor 12C through tracking control signal S5.

Figure 11:
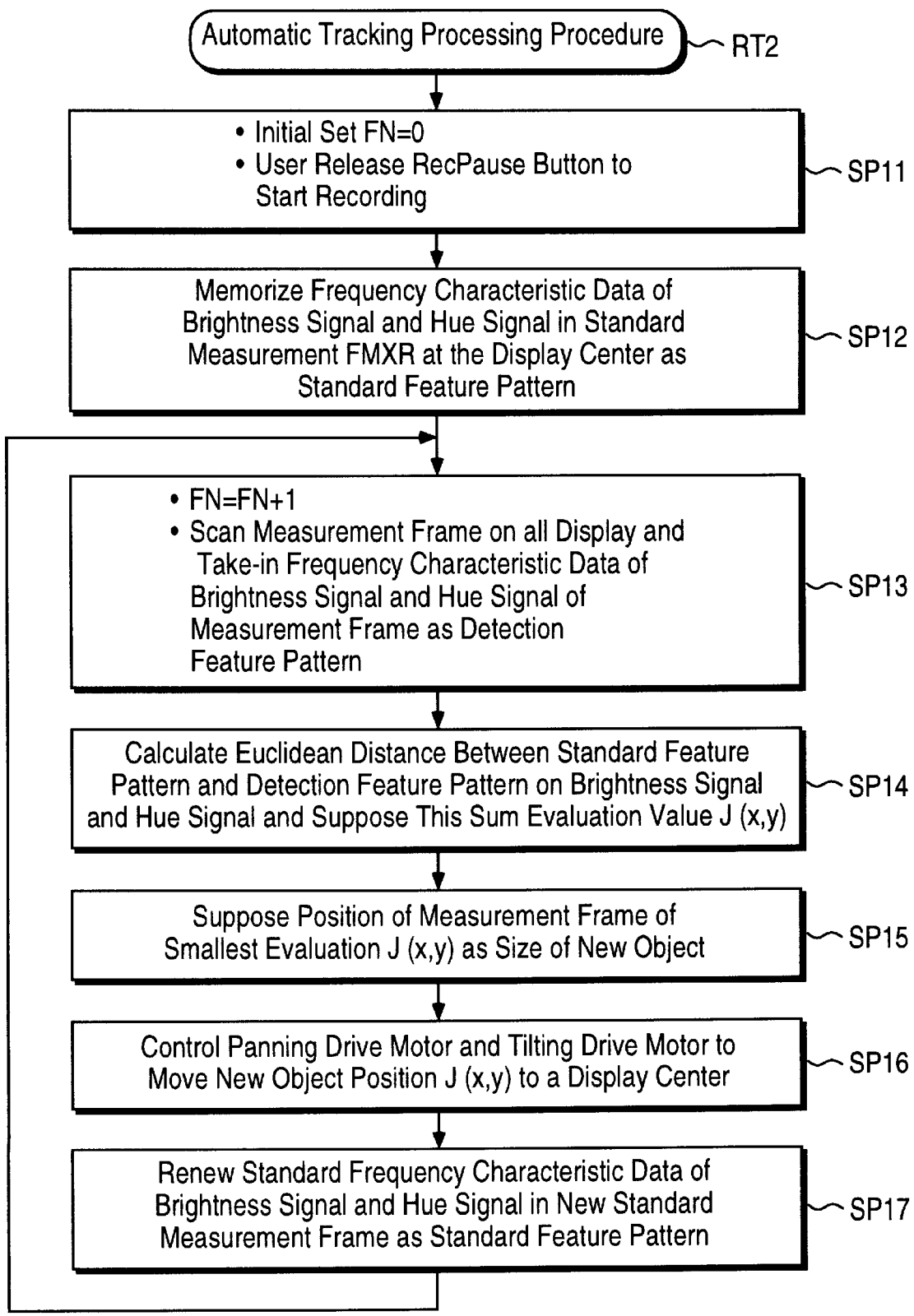
FIG. 11 is a flowchart showing the automatic tracking processing procedure of the second embodiment.

According to the construction mentioned above, carrying-out of the automatic tracking processing procedure RT2 shown in FIG. 11 by the tracking signal processing circuit 16 can always display an image of the largest similarity comparing to the image in the standard measurement frame in the standard measurement frame through a suitable controlling of the video camera.

When the tracking signal processing circuit 16 enters its automatic tracking processing procedure RT2, it initially sets in the step SP1 the frame number FN to FN=0 and waits until the user of the video camera system operates the recording button RECPAUSE so as to release the record pause condition.

When the user starts the recording at such condition of the tracking signal processing circuit 16, the tracking signal processing circuit 16 proceeds to the step SP12 and designates, as described above with reference to FIGS. 3 to 5, the standard measurement frame FMXR at the center of the display plane by the address generation circuit 17 so as to give the brightness signal Y and hue signal HUE corresponding to the picture element within the standard measurement frame to the brightness histogram generation circuit 20 and hue histogram generation circuit 19. As a result, the standard brightness frequency characteristic YStd(i) (FIG. 5) and the standard hue frequency characteristic HueStd(i) (FIG. 4) are recorded by the brightness histogram signal S12 and hue histogram signal S11 as the standard feature pattern.

In addition, the tracking signal process circuit 16 proceeds to the step SP13, in which step the address generation circuit 17 scans the position of the detection measurement frame FMXD, thus the detection measurement frame FMXD pickups the image information on the display plane PIC with units of the detection measurement frame FMXD.

Figure 12:
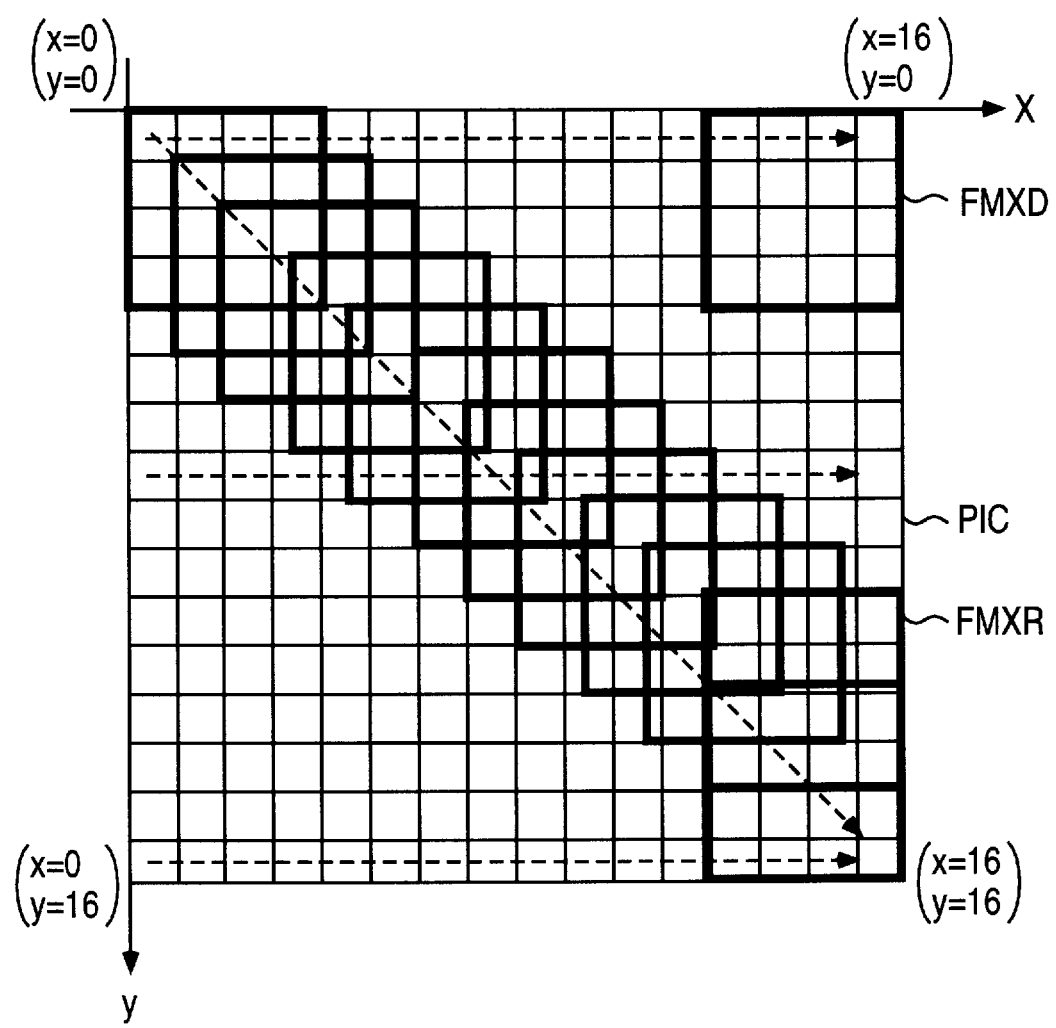
FIG. 12 is a schematic diagram showing the detection measurement frame of the second embodiment.

According to the first embodiment of this invention, the detection measurement frame FMXD has, as shown in FIG. 12 and similar to the standard measurement frame FMXR, unit regions AR of 4×4=16 pieces and the address generation circuit 17 scans by sequentially designating the unit region address at the left upper corner of the detection measurement frame FMXD from the left side to the right side and from the upper side to the lower side.

As a result, the detection measurement frame FMXD is scanned so as to sequentially shift the address (x, y)=(0, 0), (1, 0), . . . , (12, 0), (0, 1), (1, 1), . . . , (12, 1), . . . , (0, 12), (1, 12), . . . , (12, 12).

Figure 13:
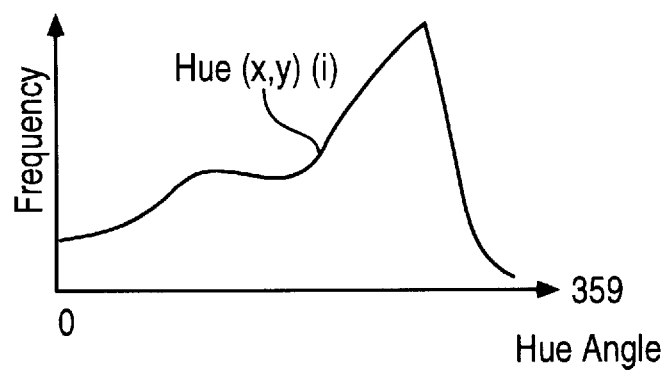
FIG. 13 is a characteristic curve diagram illustrating hue frequency characteristic obtained from the a detection measurement frame shown in FIG. 12.
Figure 14:
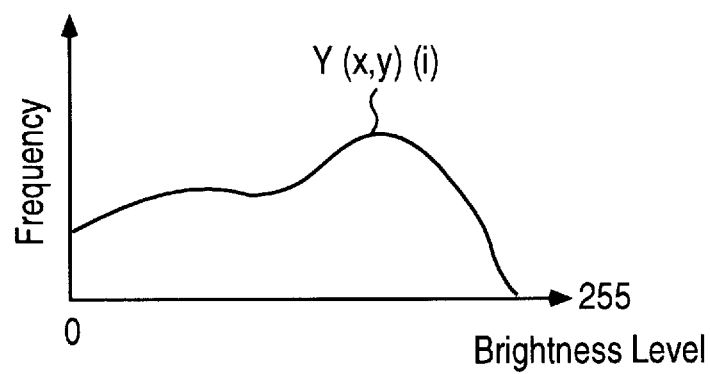
FIG. 14 is a characteristic curve diagram illustrating detection brightness frequency characteristic obtained from the detection measurement frame of FIG. 12.

During such scanning operation, the tracking signal processing circuit 16 determines the detection hue frequency characteristic Hue(x, y)(i) and the detection brightness frequency characteristic Y(x, y)(i) of the hue information and brightness information of the image of the detection measurement frame FMXD transferred to the address (x, y) position as shown in FIGS. 13 and 14.

Here, the detection hue frequency characteristic Hue(x, y) (i) shows the hue detection pattern of the detection measurement frame FMXD according to the generation frequency of the picture element of the hue angles y=0° to 359° contained in all picture elements contained in the detection measurement frame FMXD.

On the contrary, the detection brightness frequency characteristic Y(x, y)(i) depicts the detection feature pattern according to the generation frequency of the picture elements of the brightness levels 0 to 255 all the picture elements contained in the detection measurement frame FMXD have.

Continuously, the tracking signal processing circuit 16 determines, in the step SP14, concerning the brightness signal as shown in the following equation (10):

$$J1(x,y) = \sum_{i=0}^{255} |Y(x,y)(i) - Y\text{Std}(i)| \tag{10}$$

Euclidean distance J1(x, y) by totaling the absolute values of the difference between the detection brightness frequency characteristic Y(x, y)(i) and the standard brightness frequency characteristic YStd(i) concerning the detection measurement frame FMXD and the brightness levels y=0 to 255. The Euclidean distance is information expressing the similarity of the brightness information in the detection measurement frame FMXD resided at a position of an address (x, y) relatively to the brightness information of the image within the standard measurement frame FMXR.

Also, concerning hue information of the detection measurement frame FMXD, the tracking signal processing circuit 16 totals, as shown in the following equation (11):

$$J2(x,y) = \sum_{i=0}^{359} |\text{Hue}(x,y)(i) - \text{HueStd}(i)| \tag{11}$$

the absolute values on the hue angles 0° to 359° of the difference between the detection hue frequency characteristic Hue(x, y) (i) of the detection measurement frame FMXD at the address (x, y) position and the standard hue frequency characteristic HueStd(i) and determines Euclidean distance J2(x, y). So that, information is obtained depicting the similarity of the detection feature pattern of the image of the detection measurement frame FMXD at the position (x, y) relative to the standard hue pattern the image of the standard measurement frame FMXR has.

The tracking signal processing circuit 16 determines on the basis of Euclidean distance J1(x, y) and J2(x, y) determined on the brightness and hue as described above and the following equation (12):

$$J(x, y) = J1(x, y) + J2(x, y) \tag{12}$$

the evaluation value J(x, y) by calculating these sums.

As described above, the tracking signal processing circuit 16 proceeds to the next step SP15 after obtaining the evaluation value J(x, y) (x=0, 1, ... 12, y=0, 1, ..., 12) on the all detection measurement frame FMXD resided at the scanning positions (x, y) (x=0, 1, ..., 12, y=0, 1, ..., 12) of the detection measurement frame FMXD in order to determine that the position of the detection measurement frame FMXD at which position the evaluation value J(x, y) becomes the smallest is the position of the object when the present time is counted. In the next step SP16, the tracking signal processing circuit 16 gives the tracking control signal S5 for moving the new object position (x, y) to the standard measurement frame FMXR (FIG. 3) set at the central position of the display window to the tilting drive motor 12B and the panning drive motor 12C.

Continuously, the tracking signal processing circuit 16 proceeds to the step SP17 and makes the standard frequency feature data (FIGS. 4 and 5) of brightness signal and hue signal on the image newly came to the standard measurement frame FMXR, and returns to the step SP13 entering the next measurement cycle.

As described above, the following or tracking signal processing circuit 16 determines the position of the detection measurement frame FMXD having the image information of the largest similarity to the image information of the standard measurement frame FMXR on the whole picture plane PIC when the object moves relative to the television camera and controls the panning and tilting operations of the television camera so as to move the most similarized detection measurement frame FMXD to the position of the standard measurement frame FMXR. As a result, it is possible to suitably move the video camera system VCS so as to follow the moving object.

On the contrary, when the object placed at a position of the standard measurement frame FMXR does not move, it is possible to obtain an evaluation in the step SP14 that the detection feature pattern obtained from the detection measurement frame FMXD at the same position as that of the standard measurement frame FMXR has the largest similarity relatively to the standard feature pattern. As a result, the video camera system VCS is controlled to make the following signal processing circuit 16 keep the new object which continuously is placed in the detection measurement frame FMXR by means of the tracking control signal S5.

According to the construction of this invention above, as long as the user starts the recording after the object is initially placed at the center of the standard measurement frame FMXR, it is possible to surely detect the object by comparing the detection feature pattern obtained by the tracking signal processing circuit 16 on the basis of the frequency feature data of the brightness signal and hue signal to the standard detection pattern and make the video camera system suitably follow the moving object.

In order to attain such operation of the video camera system, there is no need to prepare in particular complicated structure of the circuitry of the video camera system.

Also, according to the video camera system provided with such construction above, because the standard pattern sequentially is made new according to the pass of time, it is possible to automatically track the changing object even when the object changes its direction, becomes large by advancing toward the camera, or any change happens in the object (for example, when the object is a man, he takes off his jacket).

(3) Third Embodiment

Figure 15:
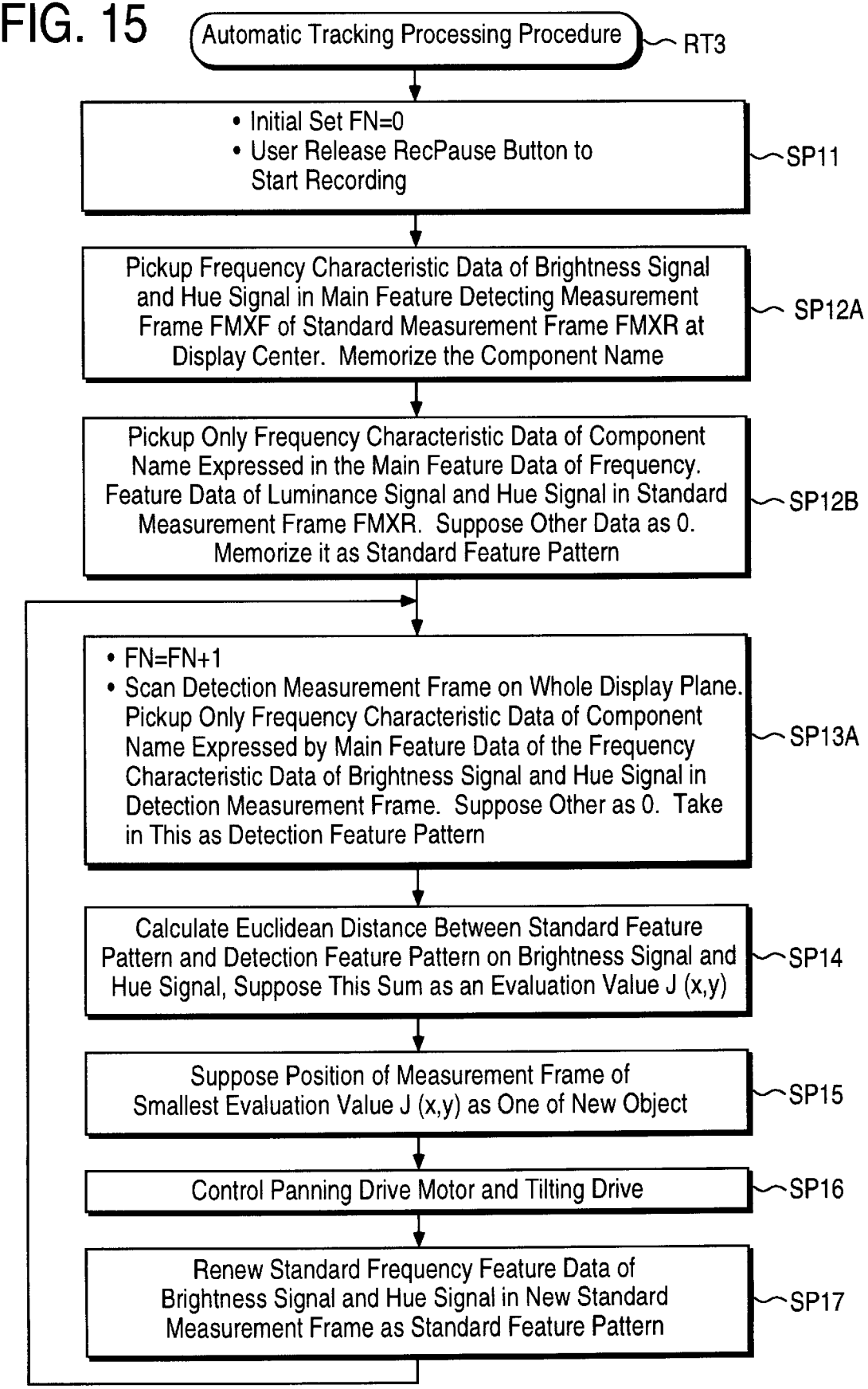
FIG. 15 is a flowchart illustrating the automatic tracking processing procedure of the third embodiment of the video camera system according to this invention.

FIG. 15 shows the third embodiment of the video camera system of this invention. The construction of the video camera system VCS has the same one as that of the second embodiment shown in FIG. 10, except that the tracking signal processing circuit 16 is adapted to carry out an automatic tracking processing procedure RT3 as shown in FIG. 15.

The parts and portions of the automatic tracking processing procedure RT3 corresponding to that of the procedure RT2 shown in FIG. 11 have the same symbols. Instead of the step SP12 shown in FIG. 11, the tracking signal processing circuit 16 carries out sequentially the steps SP12A and SP12B. In addition, instead of the step SP13 shown in FIG. 11, the tracking signal processing circuit 16 carries out the step SP13A.

Figure 16:
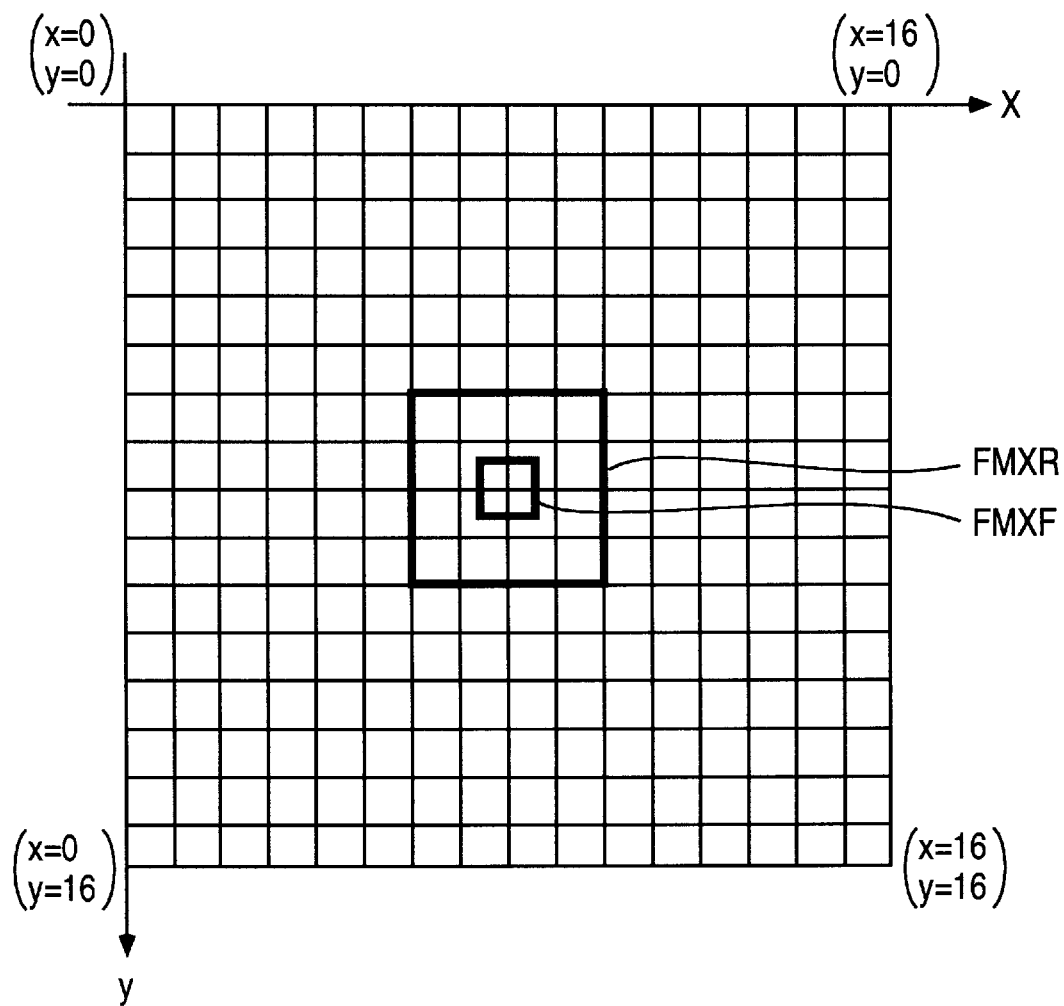
FIG. 16 is a schematic diagram showing main feature detection measurement frame set in the step SP12A shown in FIG. 15.

That is, the tracking signal processing circuit 16 enters the automatic tracking processing procedure RT3 and carries out the step SP11, then as shown in FIG. 16 picks up in the step SP12A the frequency feature data of the brightness signal Y and the hue signal HUE in a main feature detecting measurement frame FMXF provided with a region or space smaller than that of the particular standard measurement frame FMXR of these frames placed at the center of the display window and memorizes the name of component as the main feature data.

According to the third embodiment, the standard measurement frame FMXR consists of the unit regions of 4×4=16 pieces. On the contrary, the main feature detecting measurement frame FMXF is selected to have a size of 1×1=1 piece unit region at the center of the standard measurement frame FMXR.

Figure 17:
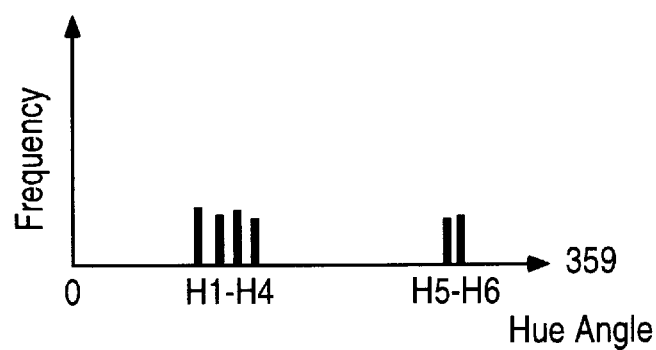
FIG. 17 is a characteristic curve diagram illustrating hue frequency characteristic obtained from main feature detecting measurement frame FMXF of FIG. 16.
Figure 18:
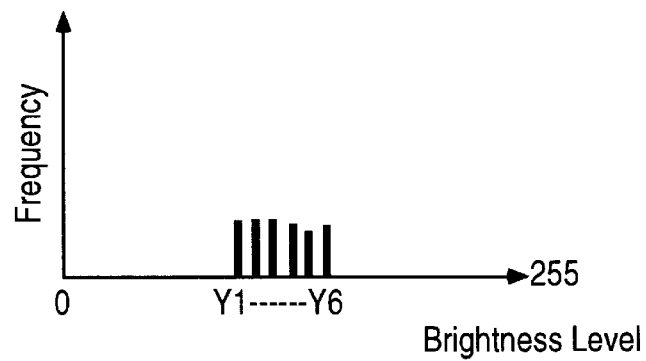
FIG. 18 is a characteristic curve diagram showing brightness frequency characteristic obtained from the main feature detecting measurement frame FMXF shown in FIG. 16.

It is noted that the frequency feature data of the brightness signal and hue signal in the main feature detecting measurement frame FMXF fails to have all element names or all hue angles 0° to 359° and brightness levels 0 to 255 as shown in FIGS. 17 and 18. In practice, the frequency feature data has only the hue angles H1 to H6 and brightness levels Y1 to Y6 as, for example, six names of the elements expressing distinctly the feature of the fine image portion.

Figure 19:
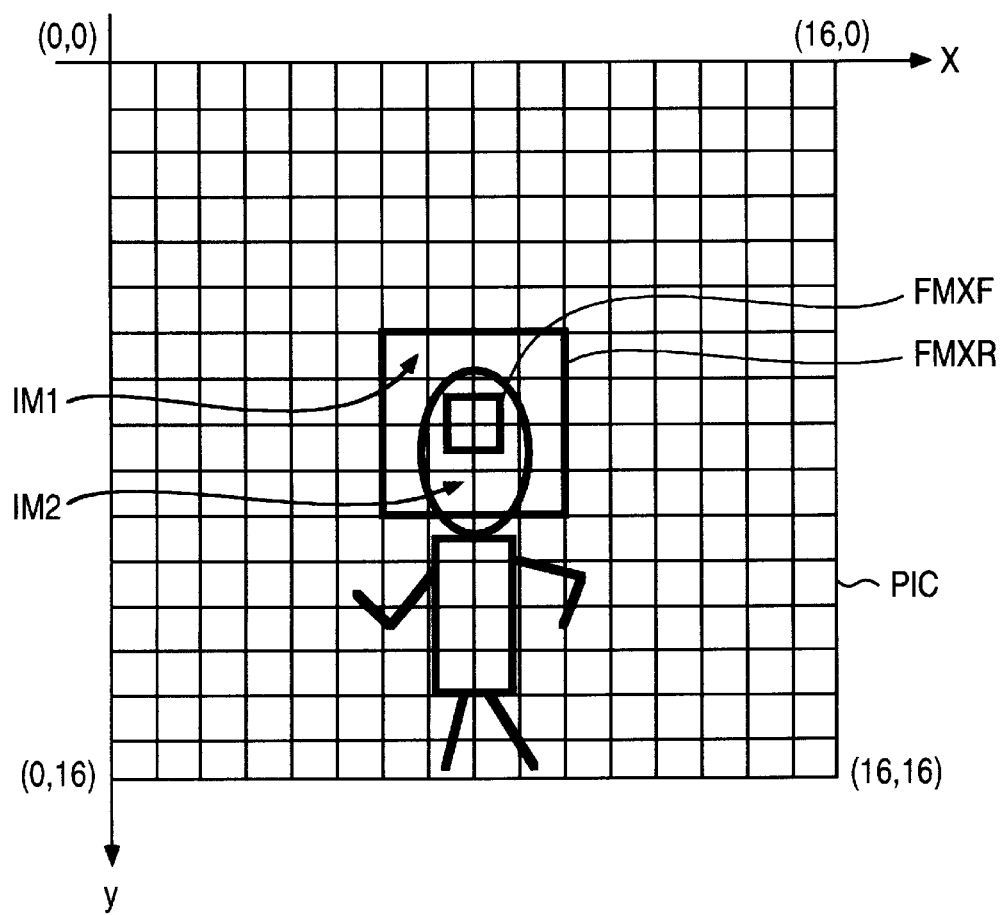
FIG. 19 is a schematic diagram explaining a setting of the main feature detecting measurement frame FMXF of, in particular, the object part to be tracked, displayed in the picture plane PIC.

For example, as shown in FIG. 19, when a whole body of a walking man is displayed on the display plane PIC, a part of the face of the walking man is displayed in a portion of the standard measurement frame FMXR, and on the contrary part of the face is seen in the whole standard measurement frame FMXR, the image in the main feature detecting measurement frame FMXF has only the hue angle components and brightness components depicting the feature of the face itself. On the contrary, the standard measurement frame FMXR having part of the face displayed in part of the frame, so that it has not only hue angle components and brightness level components expressing the feature of face, but also hue simultaneously angle components and brightness level components expressing the feature of the background except the face.

When the frequency feature of the histogram of the main feature detecting measurement frame FMXF is detected, only the hue angle components H1 to H6 depicting the feature of the face which does not have hue angle components of all the hue angles 0° to 359° on the hue signal. Similarly, concerning the brightness signal, all the brightness level components 0 to 255 are not generated and only the brightness components Y1 to Y6 corresponding to the feature of the face are generated.

Figure 20:
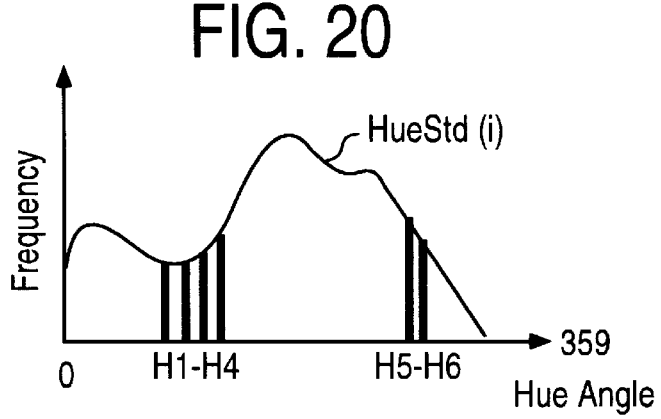
FIG. 20 is a characteristic curve diagram illustrating the hue frequency characteristic obtained from the standard measurement frame FMXR shown in FIG. 16.
Figure 21:
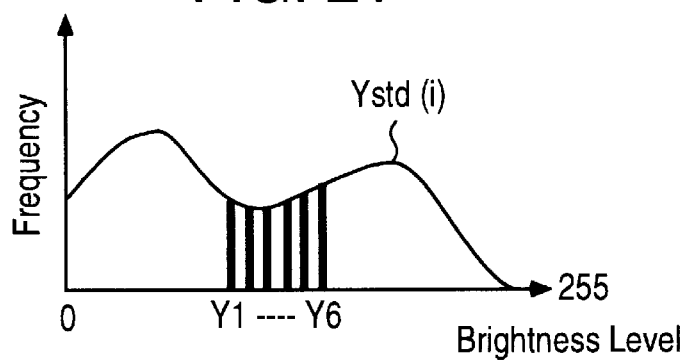
FIG. 21 is a characteristic curve diagram illustrating the brightness frequency characteristic obtained from standard measurement frame FMXR of FIG. 16.

On the contrary, the standard measurement frame FMXR displays not only the face image, but also the image of background, so that the hue signal not only contains as shown in FIG. 20 hue angle components H1 to H6 expressing the feature of the face, but also generates hue frequency characteristic HueStd(i) having other hue angle components. Similarly, as shown in FIG. 21 brightness signals of the standard measurement frame FMXR contain brightness level components Y1 to Y6 depicting the feature of part of the face, and brightness frequency characteristic YStd(i) having other brightness level components is generated.

After the tracking signal processing circuit 16 memorizes the names H1 to H6 and Y1 to Y6 of components of frequency feature data of the image portion of the main feature detecting measurement frame FMXF in the step SP12A, it proceeds to the step SP12B and pickups only the frequency feature data of the component names expressed by the main feature data of the frequency feature data of the brightness signal and hue signal within the standard measurement frame FMXR; supposes other data as 0 (zero), and memorize that data as a standard feature pattern.

Then the tracking signal processing circuit 16 proceeds to the step SP13A, in which step the address generation circuit 17 scans the position of the detection measurement frame FMXD so as to pickup only the frequency feature data of the names of components expressed by the main feature data of frequency feature data of brightness signal and hue signal by the detection measurement frame FMXD using the image information on the display plane PIC as an unit of the detection measurement frame FMXD, supposes other data as 0 (zero) taking in this as a detection feature pattern.

According to the construction of FIG. 15, when the tracking signal processing circuit 16 enters the automatic tracking processing procedure RT3 and starts a recording, step SP11, in the step SP12A as shown in FIG. 19, the operator sets the video camera so as to display part of the face of the man together with the background in the standard measurement frame FMXR, simultaneously only the face in the main feature detecting measurement frame FMXF. Then, as shown in FIGS. 17 and 18, in the step SP12A, the tracking signal processing circuit 16 obtains the hue frequency feature and brightness frequency feature having the names of components H1 to H6 and Y1 to Y6 depicting the feature of part of the face. As shown in FIGS. 20 and 21 in the step SP12B, the tracking signal processing circuit 16 has the values of the frequency feature components of the names of components H1 to H6 and Y1 to Y6 of the hue frequency characteristic HueStd(i) and brightness frequency characteristic YStd(i) of the whole picture of the background and part of the face in the standard measurement frame FMXR, as well as generates the hue frequency feature and brightness frequency feature having a value of 0 (zero) of other frequency feature components.

Figure 22:
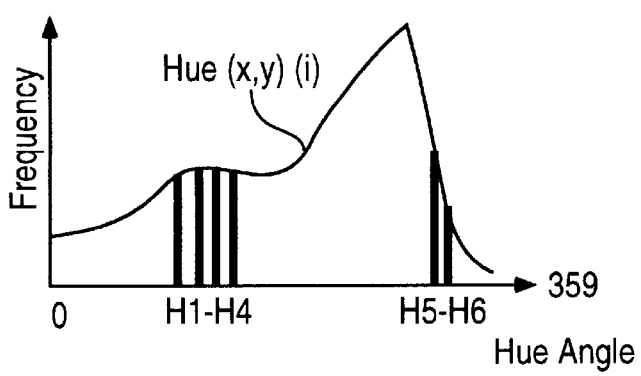
FIG. 22 is a characteristic curve diagram illustrating the hue frequency characteristic obtained when the display plane PIC is scanned by the detection measurement frame FMXD (FIG. 17)
Figure 23:
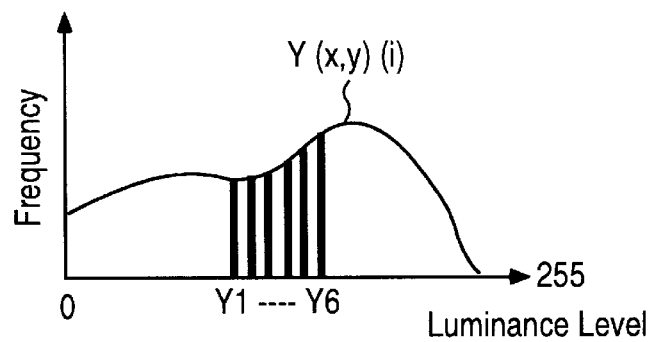
FIG. 23 is a characteristic curve diagram illustrating the brightness frequency characteristic obtained when the display plane PIC is scanned by the detection measurement frame FMXD (FIG. 12)

Continuously, the tracking signal processing circuit 16 scans in the step SP13A the whole display plane PIC by means of the detection measurement frame FMXD (FIG. 12), and generates at respective scanning positions of the detection measurement frame FMXD, as shown in FIGS. 22 and 23, the detection feature pattern containing only the frequency feature data of the component names H1 to H6 and Y1 to Y6 depicted by the main feature data of the detection hue frequency characteristic Hue(x, y)(i) and detection frequency characteristic Y(x, y) (i) and other component names of the frequency feature data of 0 (zero).

Then, in the step SP14, the tracking signal processing circuit 16 as shown in the equations (10) and (11) above, after determining Euclidean distance between the standard feature pattern and detection feature pattern, uses the equation (12) to determine the evaluation value J(x, y) of the sum. In the step SP15, supposing that the position of the measurement frame having the smallest evaluation value J(x, y) is the new position of the object, the tracking signal processing circuit 16 controls the panning drive motor 12C and the tilting drive motor 12B so as to move the position J(x, y) of the new object to the center of the display plane PIC, then carries out in the step SP17 a repeating procedure for renewing the standard feature pattern.

As described above, the tracking signal processing circuit 16 in the steps SP15 and SP16 determines a new object and drives the panning drive motor and the tilting drive motor moving the new object to the center of the display window. At least as shown in FIG. 24, the position of the detection measurement frame FMXD nearest to the feature of in particular the main feature detecting measurement frame FMXD of many detection measurement frames FMXD obtained by the scanning is detected in order to carry out the panning and the tilting operation.

Figure 24:
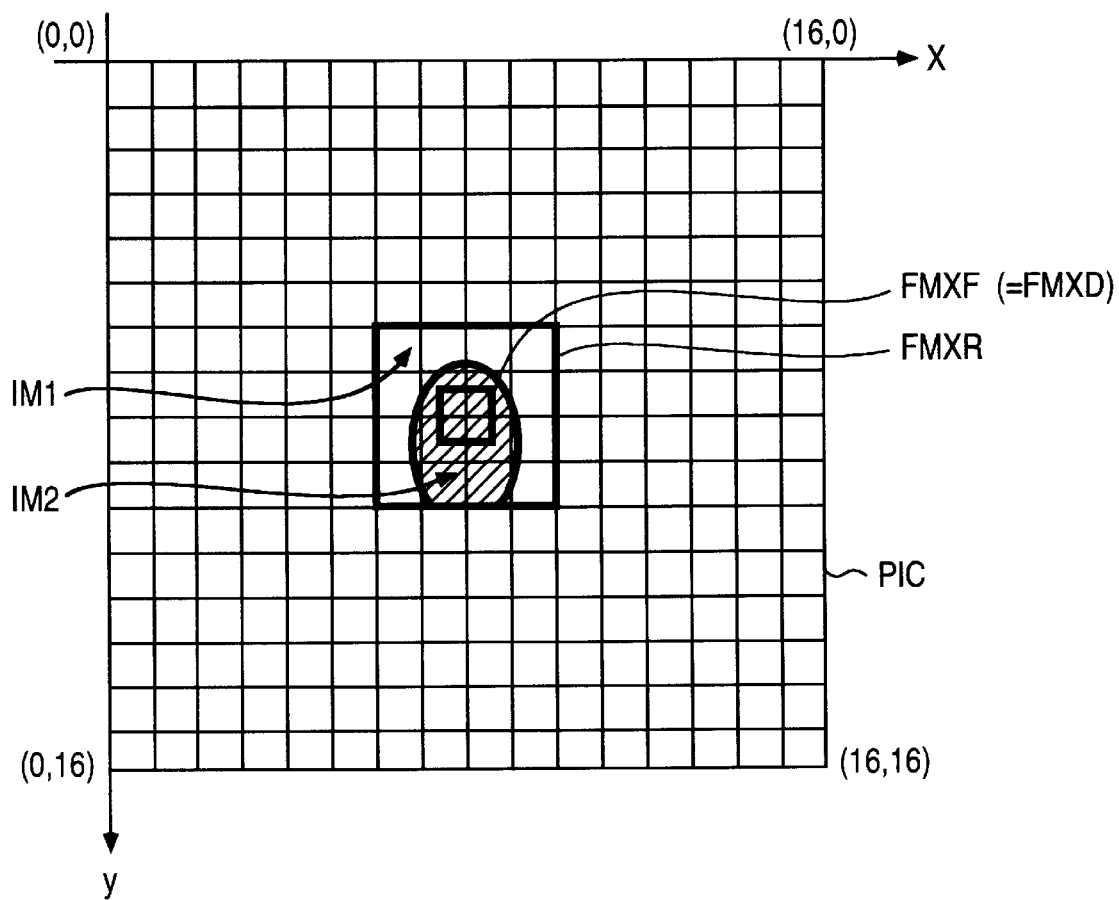
FIG. 24 is a schematic diagram explaining an automatic tracking of the particular object part.

As a result, as shown in FIG. 24 the tracking signal processing circuit 16 can track the feature of the face part IM2 set in the main feature detecting measurement frame FMXF of the features in the standard measurement frame FMXR (detection measurement frame FMXD) containing background part IM1 and face part IM2 as a main comparison judgment condition. Consequently, it is possible to enable the video camera system VCS to effectively avoid generating a phenomenon in which it is erroneously attracted to the background part.

(4) Other Embodiments Relative to the First to Third Embodiments

According to the second and the third embodiments described above, this invention is applied to use the detection result of the moving position of the object in order to control the television camera to pan and tilt and track the object at the central position of the display plane PIC. However, the same effect can be obtained if this invention compares the auto-focus information as the standard feature pattern and the detection feature pattern or from the view point of auto iris information in order to determine the detection measurement frame FMXD having the largest similarity and automatically controls the focus or iris on the basis of the position information.

Further, according to the embodiment above, the picture element information consisting of the display plane PIC is formed in the lens block portion 1, and zooming, panning and tilting operations of the lens block portion 1 makes the displayed image track the motion of the object.

However, the same effect can be obtained if the imaging output signal S1 from the lens block portion 1 is memorized in the image memory 15 and the memorized image data is zoomed, panned and tilted in these processes in order to form the display plane.

Furthermore, according to the third embodiment of the video camera system, when the standard feature pattern and detection feature pattern are obtained in the steps SP12B and SP13A (FIG. 15), the value of the frequency feature data of the name of the component other than the component names expressed by the main feature data is made 0 (zero). However, it is possible to use a value other than 0 if necessary instead of the previous case. In short, it is possible to obtain the same effect if the value is replaced by the predetermined value.

(5) Fourth Embodiment

Figure 25:
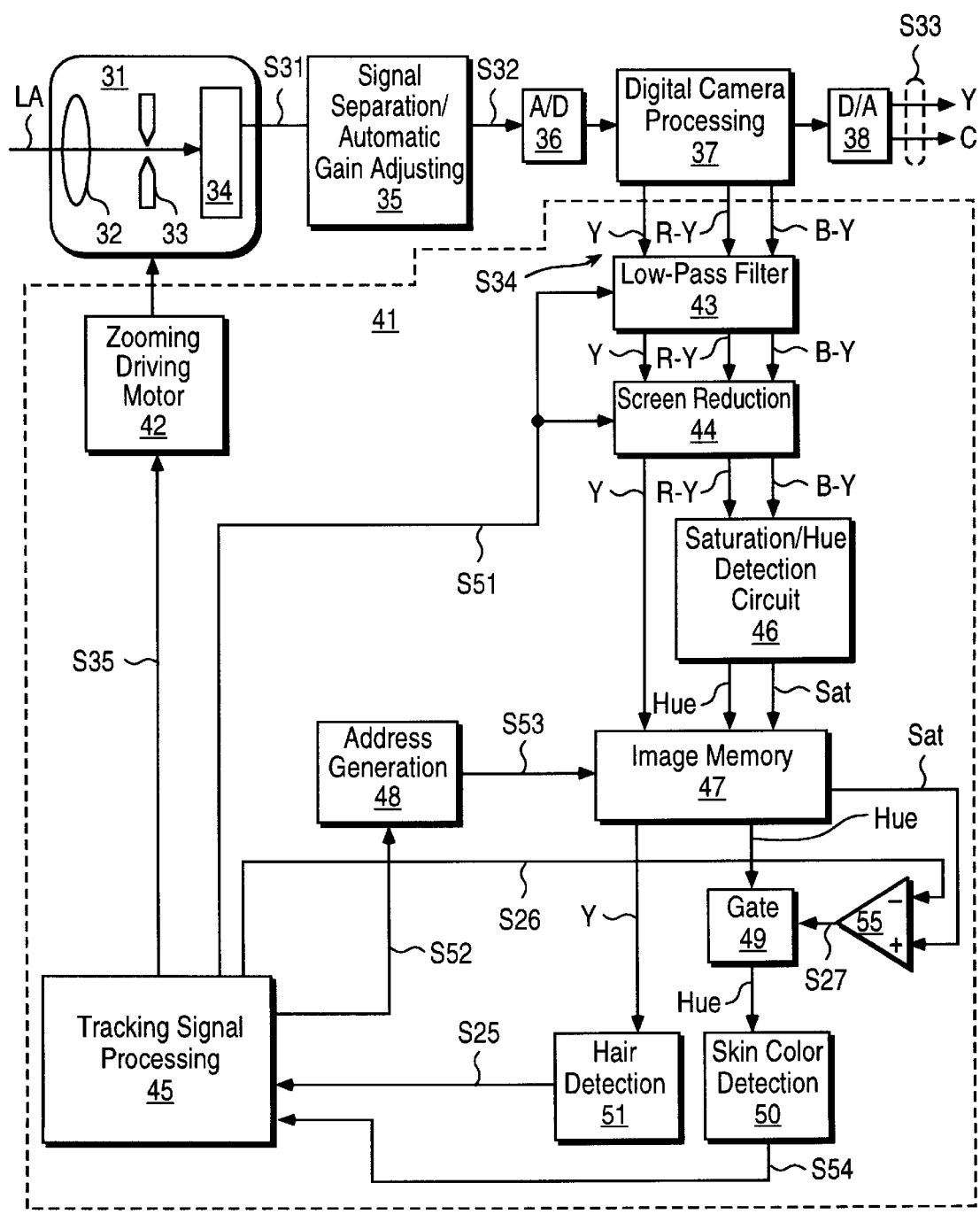
FIG. 25 is a block diagram showing the fourth embodiment of the video camera system according to this invention.

In FIG. 25, VCS generally shows a video camera system The video camera system VCS is applicable to an autonomous target tracker with human recognition (ATT-HR) system having a human face model tracking a human face model as its object.

The video camera system VCS receives image light LA which comes from the human face model as an object at an image pickup device 34, consisting of, for example, a charge coupled device (CCD), via a lens 32 of a lens block unit 31 and an iris 33, and transmits image output signal S31, depicting the object image, to a signal separation/automatic gain adjusting circuit 35.

The signal separation/automatic gain adjusting circuit 35 sample holds image output signal S31 and simultaneously, image output signal S32 is gain controlled in order to have the prescribed gains by the control signal from an auto iris (AE) system (not shown) and, thus obtained image output signal S32 is supplied to a digital camera processing circuit 37 through an analog-to-digital converter 36.

The digital camera processing circuit 37 forms brightness signal Y, chrominance signal C and color difference signals R-Y and B-Y according to image output signal S32, and outputs brightness signal Y and chrominance signal C through digital-to-analog converter 38 as video signal S33.

Further, the digital camera processing circuit 37 supplies brightness signal Y and color difference signals R-Y and B-Y as target tracking detection signal S34 to a tracking control circuit 41, and the tracking control circuit 41 generates tracking control signal S35, for a zooming driving motor 42 equipped in the lens block unit 31, according to the target zooming detection signal S34.

The tracking control circuit 41 supplies brightness signal Y and color difference signals R-Y and B-Y to a screen reduction circuit 44 via a low-pass filter 43. The screen reduction circuit 44 executes the processing to divide the display plane PIC of brightness signal Y and color difference signals R-Y and B-Y of each picture element to be output from the digital camera processing circuit 37 into unit areas of 32×32 or 16×16 pieces by means of screen reduction control signal S51 to be output from the tracking signal processing circuit 45.

With this arrangement, hue signal HUE and saturation signal SAT will be supplied to an image memory 47 by giving color difference signals R-Y and B-Y, corresponding to unit areas of 32×32 or 16×16 pieces, to the saturation/hue detection circuit 46 from the screen reduction circuit 44, and simultaneously, brightness signal Y will be supplied directly to the image memory 47.

In this case, the image memory 47 has the memory area for 32×32 blocks, and thus, the picture element data for 1 field to be output from the screen reduction circuit 44 corresponding to unit areas of 32×32 pieces or unit areas of 16×16 pieces will be compressed to the image information for 32×32 or 16×16 blocks and stored in the image memory 47. As a result, in ordinary cases it is necessary to have memory capacity of one field on the picture element, however, in the case of FIG. 25 it can be further simplified.

The saturation/hue detection circuit 46 forms hue signal HUE and saturation signal SAT by rectangular coordinate/polar coordinate converting color difference signals R-Y and B-Y and recognizes the human face model as an object based on the visual stimulation which the human beings can perceive by means of brightness signal Y, hue signal HUE and saturation signal SAT.

In this connection, as shown in FIG. 2, the visual stimulation which human beings can generally perceive, can be expressed by the color coordinate system called as "HLS system" which has L axis and SH plane intersecting perpendicularly to L axis.

In utilizing these features of HLS color coordinate system, the tracking control circuit 41 extracts the feature of human face model as an object, and when the feature changes, the zooming driving motor 42 will be driven in order to follow the change and as a result, a video signal which zooms following the movement of the object as video signal S33 will be obtained.

Figure 26:
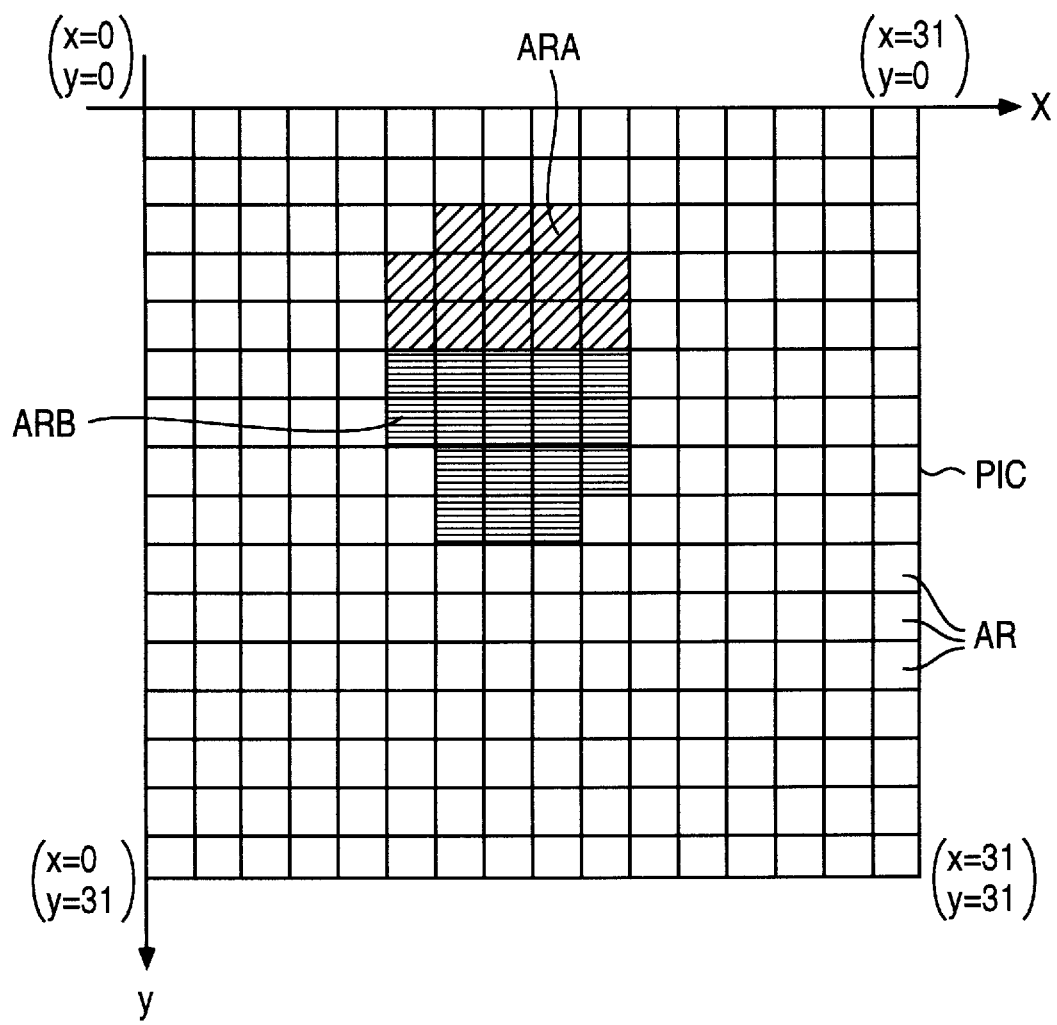
FIG. 26 is a schematic diagram showing a display plane PIC wherein the image information can be obtained by dividing into small areas.

More specifically, detection signal S34 for zooming the target memorized in the image memory 47, by giving the block defining signal S52 to be output from the microprocessor composed tracking signal processing circuit 45 to an address generation circuit 48 as shown in FIG. 26, supplies the address signal S53 for dividing the display plane PIC formed in the image memory 47 into unit areas AR of the predetermined size based on xy rectangular coordinates (x, y).

Thus, the data of each block which constitutes the display plane PIC of the image memory 47 will be read out in each unit area AR and will be evaluated as an image information in each unit area AR.

In the case of this embodiment, the display plane PIC is divided into 32 (or 16) unit areas AR in the directions of x and y respectively, and thus, by designating coordinates x=i, y=j of rectangular coordinates (x, y) on unit areas of 32×32 (or 16×16) pieces, the image information (X=i, y=j) of unit areas AR to be designated can be read out.

With this arrangement, in the image information I (x=i, y=j) to be read out in each unit area AR from the image memory 47, while hue signal HUE element is given to a skin color detection circuit 50 through a gate circuit 49, the brightness signal Y element is given directly to a hair detection circuit 51.

The skin color detection circuit 50 detects the image part of skin in the human face model and when the incoming hue signal HUE element of each block is within the range of prescribed skin color, outputs prospective skin color detection output S54.

In practice, the dynamic range of hue signal HUE element takes the value in a region of angles 0* to 359*.

On the other hand, the hair detection circuit 51 detects hair areas in the image part of the human face model and in the case of this embodiment, the dynamic range of brightness signal Y is expressed by the values 0 to 255 (8 bit) and when the brightness signal Y of each picture element is under the value 50, it defines as block and judges said picture element exists in the hair area and outputs prospective hair detection signal S55 to the tracking signal processing circuit 45.

In the case of this embodiment, a hue noise gate signal forming circuit 55 composed of comparators is equipped for the gate circuit 49 and compares saturation signal SAT to be read out from each block of the image memory 47, with noise judging signal S56 to be output from the tracking signal processing circuit 45, and by giving gate signal S57 which operates the gate circuit 49 to close when saturation signal SAT is under the prescribed level to the gate circuit 49, the hue signal HUE element of the picture element will not be input to the skin color detection circuit 50.

In this connection, in the case where hue signal HUE detected at the saturation/hue detection circuit 46 is in the neighborhood of L axis (FIG. 2), this means that said hue signal HUE has small saturation and is noise and has no meaning as information. These meaningless hue signals HUE will be eliminated at the gate circuit 49.

Figure 27:
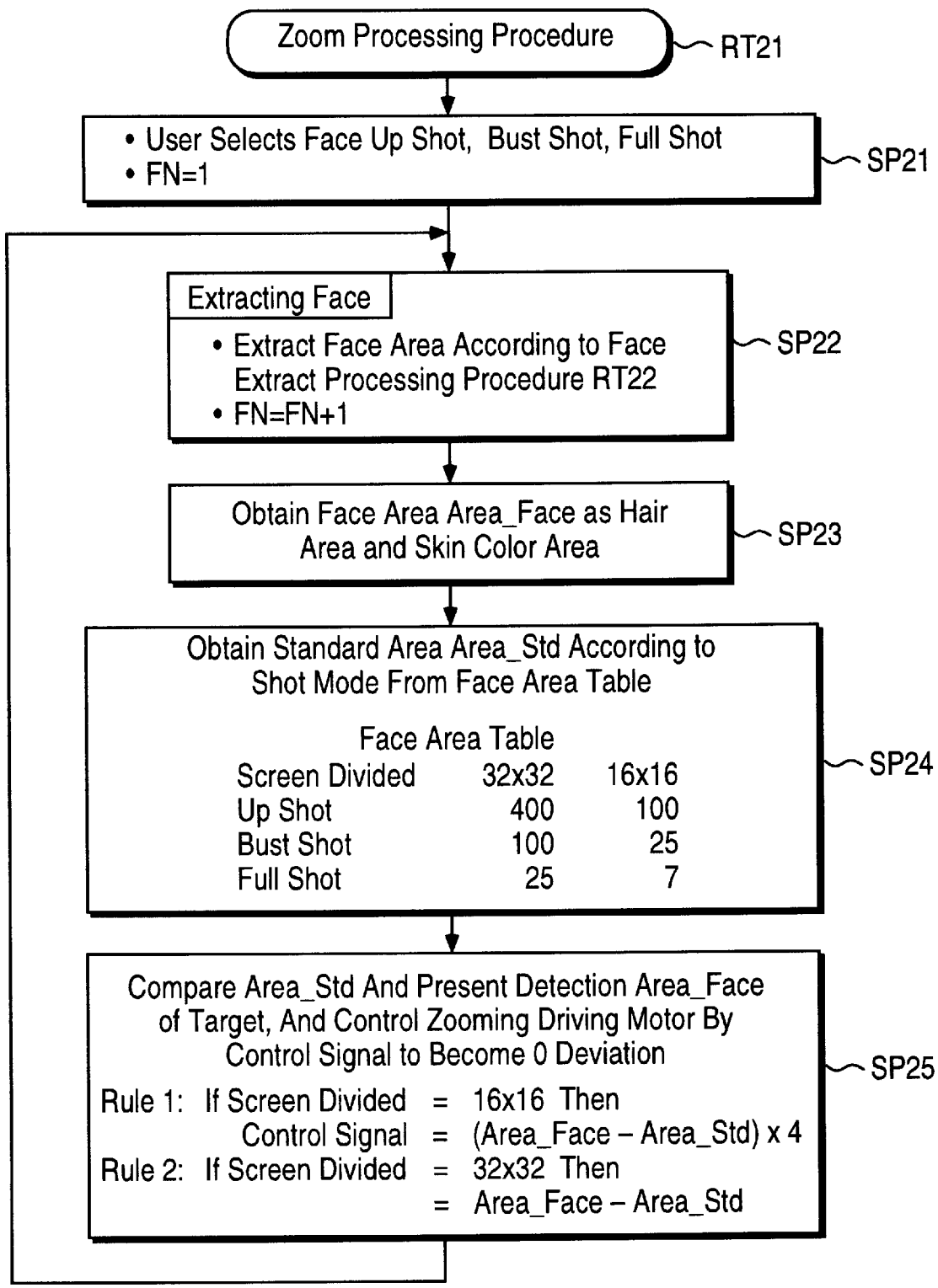
FIG. 27 is a flowchart illustrating the zooming processing procedure.

According to the foregoing construction, the tracking signal processing circuit 45 executes a zooming processing procedure RT21 as shown in FIG. 27 and performs the processing to project the face image of approximately the same size constantly on the display plane PIC.

More specifically, when the tracking signal processing circuit 45 enters in the zoom processing procedure RT21, it waits for the user to select the face up-shot, bust shot or full shot at step SP21 and sets the frame number FN to FN=1, and thus, the tracking signal processing circuit 45 sets the video camera system to the initial stage.

Then, the tracking signal processing circuit 45 proceeds to step SP22 and extracts face areas according to the face extracting processing procedure RT22 (FIGS. 28 and 29) and increments the frame number FN to FN+1.

Figure 28:
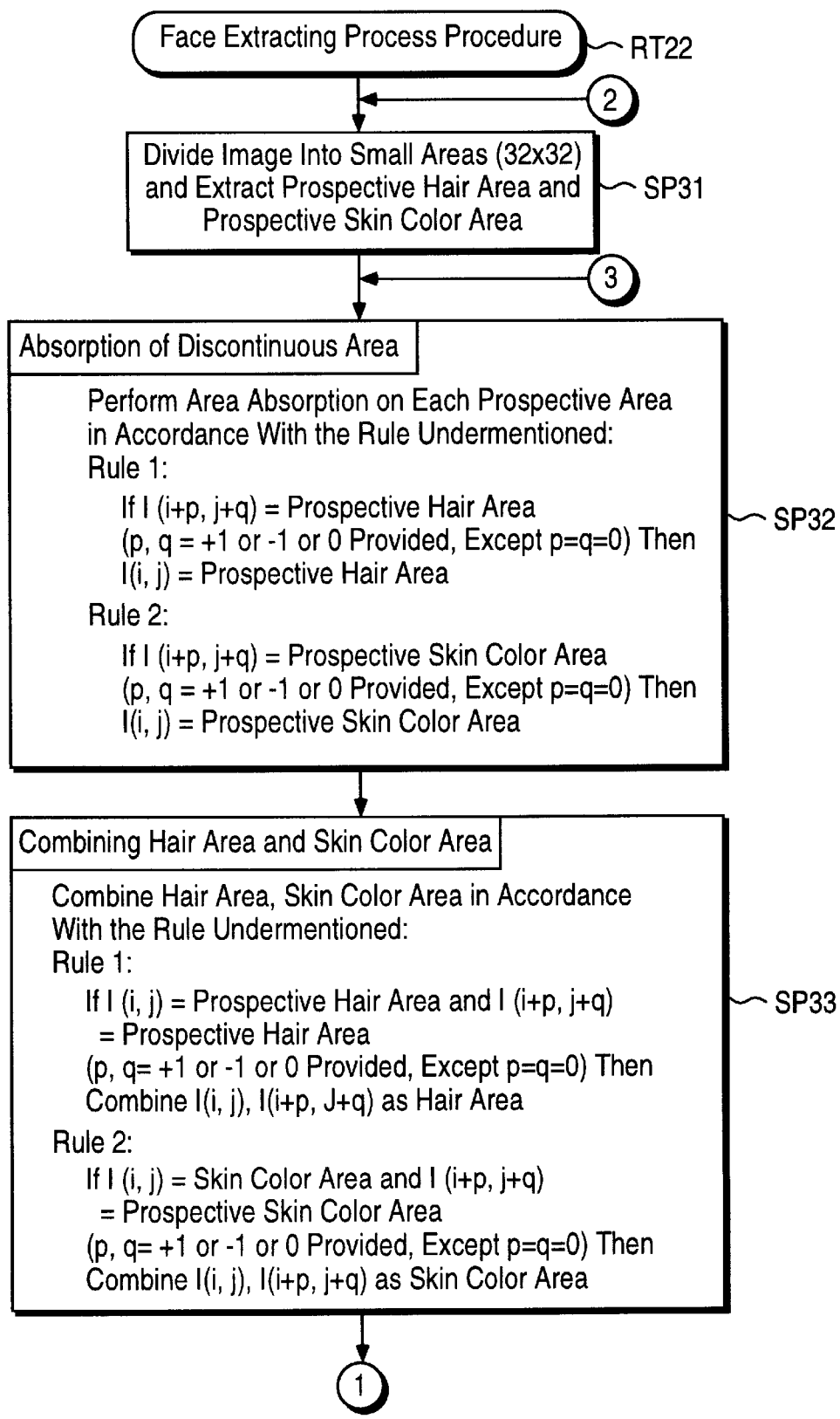
FIG. 28 is a flowchart illustrating the face extracting processing procedure.
Figure 29:
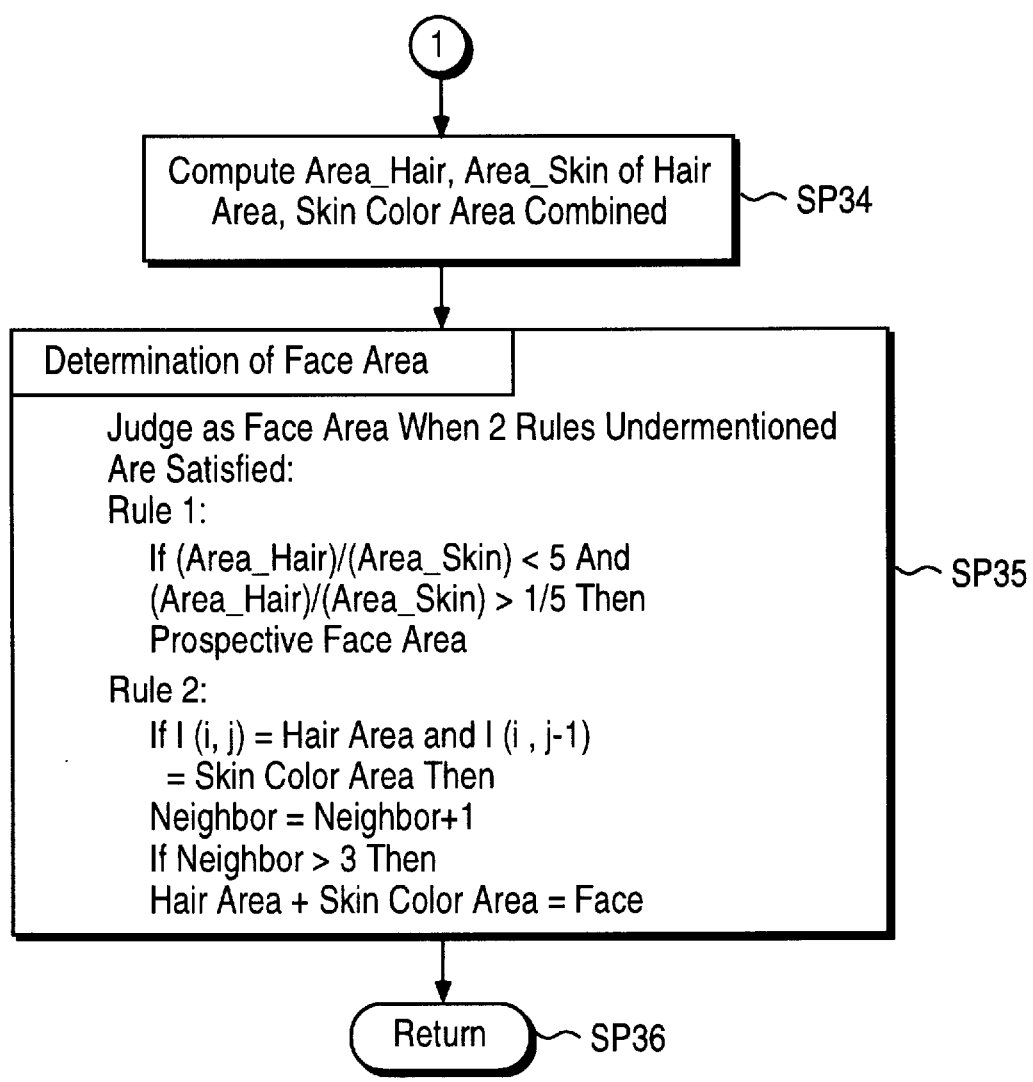
FIG. 29 is a flowchart illustrating the face extracting processing procedure continued from FIG. 28.

As shown in FIGS. 28 and 29, the face extracting processing procedure RT22 judges the characteristic of image on the display plane PIC from skin color detection signal S54 and prospective hair detection signal S55 to be obtained in accordance with hue signal HUE and saturation signal SAT and gives tracking control signal S35 to the zooming driving motor 42 in order that the size of the human face model to be projected on the display plane PIC becomes approximately the same constantly.

More specifically, when the tracking signal processing circuit 45 enters in the face extracting processing procedure RT22 of FIG. 28, it divides the display plane PIC into 32×32 unit areas AR at step SP31 and then, makes skin color detection circuit 50 and hair detection circuit 51 detect whether the image part of the picture element block is skin color or hair on the picture element block contained in each unit area AR, and if the unit area is prospective skin area, inputs the prospective skin color detection signal S54 and simultaneously, in the case where the unit area AR is prospective hair area, inputs respective hair detection signal S55.

Thus, the procedure of step SP31 is terminated, and the tracking signal processing circuit obtains the distribution condition of unit areas AR judged as prospective hair unit areas ARA and prospective skin color unit areas ARB as shown in FIGS. 26 and 29.

At this point, if prospective hair area ARA and prospective skin color area ARB are adjacent each other without any space and moreover, if the extraction result showing there is no space between a group of prospective hair unit areas ARA and a group of prospective skin color unit areas ARB is obtained, it means that the information to conform to the actual condition of human face model as a target has been obtained.

However, in ordinary circumstances, the direction and reflex manner of the light source for the target are not uniform; accordingly, there occur blank areas in groups of prospective hair areas ARA and prospective skin color areas ARB as shown in FIG. 29, and moreover, there are many cases wherein extraction results show that there are blank areas between the groups of prospective hair areas ARA and prospective skin color areas ARB.

Then, the tracking signal processing circuit 45 absorbs the discontinuous areas according to "hair area absorption rule 1" and "skin color area absorption rule 1" at the following step SP32.

The "absorption rule 1" of discontinuous areas is "If I(i+p, j+q)=prospective hair area (p, q=+1 or −1 or 0, provided exception p=q=0), absorb I(i, j)=as prospective hair area".

This "absorption rule 1" of discontinuous areas means that if there are prospective hair unit areas ARA in the neighboring area centering around the unit areas AR in the address (x=i, y=j) areas, the image information I(i, j) of the designated unit areas (x=i, y=j) will be absorbed in the prospective hair unit areas ARA.

Figure 30:
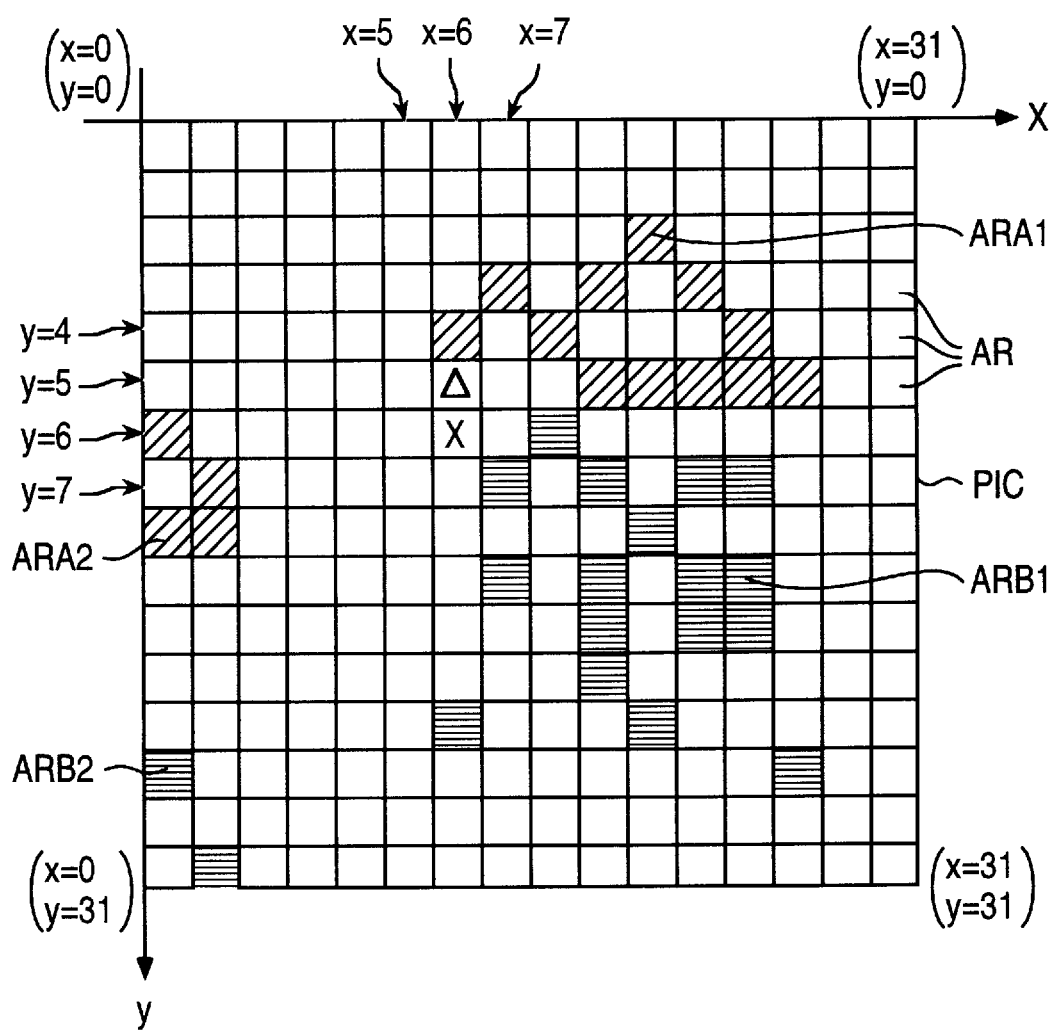
FIG. 30 is a schematic diagram showing a display plane PIC having detected hair area and skin color area.

For example, in FIG. 30, when a vacant small area (x=6, y=5) (shown with * mark) is designated as a designated area, the vacant unit area (x=6, y=5) will be absorbed in a group of prospective hair areas ARA1 by the "absorption rule 1" since the hair area (x=6, y=4) is included in unit areas AR, i.e., (x=5, y=4), (x=6, y=4), (x=7, y=4), (x=7, y=5), (x=7, y=6), (x=6, y=6), (x=5, y=6), and (x=5, y=6) which surround the vacant small area (x=6, y=5).

Also, the "absorption rule 2" of discontinuous area will be applied after applying the "absorption rule 2", and its content is as follows: If I(i+p, j+q)=prospective skin color area, (p, q=+1 or −1 or 0, provided except p=q=0), then absorb I(i, j) as prospective skin color area.

This "absorption rule 2" of discontinuous area is the same as described above regarding prospective hair unit area ARA, if there exists prospective skin color area in the neighbor areas of the designated unit area (x=i, y=j), the image information I(x=i, y=j) of the designated unit area (x=i, y=j) will be absorbed as prospective skin color unit area ARB.

For example, as shown in FIG. 30, if the vacant unit area (x=6, y=6) (shown with x mark) is designated as a designated area, skin color unit area (x=7, y=7) is included as prospective skin color unit area ARB1 in unit areas AR which surround the vacant unit area (x=6, y=6), the blank unit area (x=6, y=6) will be absorbed in a group of prospective skin color unit areas ARB1.

Figure 31:
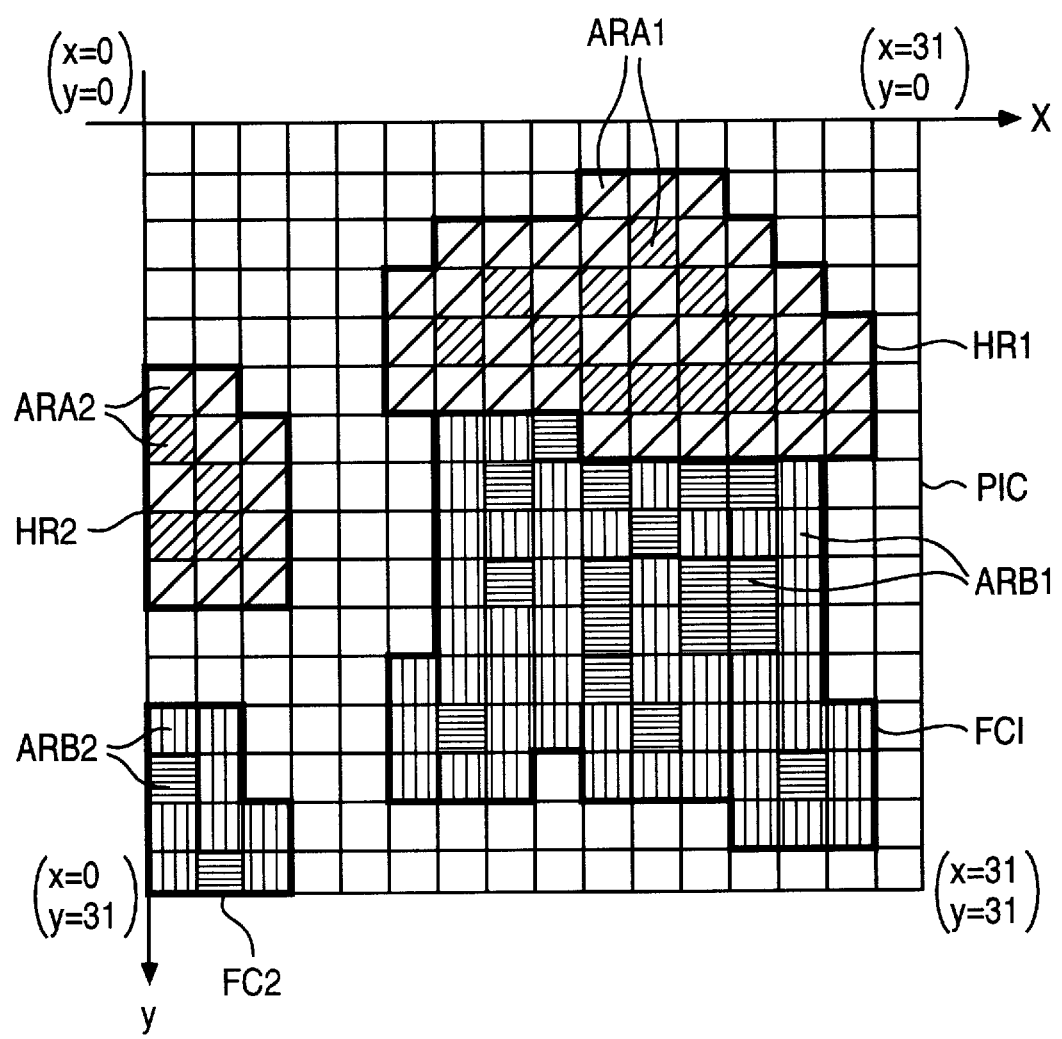
FIG. 31 is a schematic diagram showing a display plane PIC to be formed by processing the hair area and skin color area of FIG. 30 absorbed and combined.

Accordingly, when the absorption processing of discontinuous areas at step SP32 is terminated and as shown in FIG. 30, since the group of prospective hair unit areas ARA1 is discontinuous because there exist blank areas in the group of prospective hair unit area ARA1, the discontinuous unit areas can be filled in as absorbed area ARA1 as shown in FIG. 31.

Likewise, as shown in FIG. 31, since the prospective skin color unit area ARB1 is discontinuous because of blank areas in the group of prospective skin color unit areas ARB1, the blocks can be filled in with absorbed prospective skin color unit areas ARB2.

When the processing of step SP32 is terminated, the tracking signal processing circuit 35 proceeds to step SP33 and defines the determination of hair areas and skin color areas by the "hair area determination rule 1" and the "skin color area determination rule 2".

The "hair area determination rule 1" is "If I(i, j)=prospective hair area and (i+p, j+q)=prospective hair area (p, q=+1 or −1 or 0, provided, excepting p=q=0), then I(i, j), I(i+p, j+q) will be combined as hair area.

This "hair area determination rule 1" means that in the case where there exist prospective hair small areas in the neighboring small areas centering around the unit areas in the address (x=i, y=j) unit area, the image information I(i, j) of the designated area (x=i, y=j) will be combined in the hair unit area group HR.

Also, the "skin color area determination rule 2" combines I(i, j), I(i+p, j+q) as skin color area "If I(i, j)=prospective skin color area, and I(i+p, j+q)=prospective skin color area, and (p, q=+1 or −1 or 0), provided, excepting p=q=0).

This "skin color area determination rule 2" combines the image information I(x=i, y=j) of the designated unit area and the image information of neighboring area of prospective skin color unit area in the skin color area group FC if there exists prospective skin color unit area in the neighboring area of the designated unit areas (x=i, y=j) as described above regarding the prospective hair unit area.

Then, for instance, as described above, if the "hair area determination rule 1" is applied to the area (x=6, y=5) which is marked by Δ and absorbed in the hair unit area (FIG. 27) by the "hair area absorption rule 1", hair unit areas (x=5, y=5), (x=5, y=4), (X=6, y=4), (x=7, y=4), and (x=7, y=5) are included as prospective hair unit areas in unit areas around the unit area (x=6, y=5), i.e., (x=5, y=4), (x=6, y=4), (x=7, y=4), (x=7, y=5), (x=7, y=6), (x=6, y=6), (x=5, y=6), and (x=5, y=5), and then, areas (x=5, y=4), (x=6, y=4), (x=7, y=4), (x=7, y=5), (x=6, y=5), and (x=5, y=5) will be combined as the hair unit area group FC1.

Moreover, as described above, for example, if the "skin color area determination rule 2", is applied to the unit area (x=6, y=6) absorbed in the skin color unit area by the "skin color area absorption rule 2" and marked by x mark, areas (x=6, y=6), (x=7, y=6), (x=7, y=7), and (x=6, y=7) will be combined as the skin color unit area group FC1 because skin color unit areas (x=7, y=6), (x=7, y=7), and (x=6, y=7) are included as prospective skin color unit area in unit areas around the unit area (x=6, y=6), i.e., (x=5, y=5), (x=6, y=5), (x=7, y=5), (x=7, y=6), (x=7, y=7), and (x=6, y=7).

With this arrangement, as shown in FIG. 31, unit area groups HR1 and HR2 in the display screen PIC are combined as the hair area and unit area groups FC1 and FC2 are combined as the skin color area at steps SP22 and SP23 by absorbing discontinuous unit areas and by combining hair unit area and skin color unit area.

Then, the tracking signal processing circuit 45 proceeds to step SP34 of FIG. 29 and calculates an Area Hair and an Area Skin of combined hair areas HR1 and HR2 and skin color areas FC1 and FC2.

In the case of display screen PIC, as shown in FIG. 31, the Area Hair of the hair area HR1 is calculated as the total number of areas contained in the Area Hair HR1=45, and in the same manner, the Area Hair of the hair area group HR2 is calculated as the Area Hair HR2=14 and the Area Skin of skin color area group FC1 is calculated as the Area Skin FC1=66 and also the Area Skin of skin color area group FC2 is calculated as the Area Skin FC2=10.

Then, the tracking signal processing circuit 45 proceeds to step SP35 and judges the processing to determine the face area under the condition to satisfy the condition of the "face area determination rule 1" and "face area determination rule 2".

The "face area determination rule 1" defines one group of hair unit areas and one group of skin color unit areas as a set of areas and if the ratio of the Area Hair of a group of hair areas to the Area Skin of a group of skin color area is "(Area Hair)/(Area Skin)<5 and (Area Hair)/Area Skin)>$\frac{1}{5}$", then determines as a "prospective face area".

This "face determination rule 1" judges that this set of unit area groups is most possibly the face area if the area ratio of the hair unit area group to the skin color unit area group is less than five times and more than $\frac{1}{5}$ times.

The above judgment avoids the possibility of misjudging in the case where all dark area would be hair area, such as the image having many unit areas with dark brightness level on the display plane PIC (e.g., there is a dark screen in the back); similarly, in the case where there exist a large quantity of skin color unit areas besides the face skin, it is possible that the face area may not correctly be judged, and thus, the above judgment avoids erroneous judgment.

Furthermore, the "face area determination rule 2" defines that "If I(i, j)=hair area and I(i, j−1)=skin color area, then Neighbor=Neighbor+1; and if Neighbor>3, then hair area+ skin color area=face".

If the upper side of the screen is hair unit area groups (i.e., I(i, j)) and the lower side is skin color area groups (i.e., I(i, j−1)) and under the condition that these hair unit area groups and skin color unit area groups are in contact with at least three unit areas, the "face area determination rule 2" judges a set of hair area group and skin color area group as the face.

According to this "face area determination rule 2", a pair of unit area groups, i.e., a set of hair area group HR1 and skin color area group FC1 is touched with 8 unit areas and satisfies this rule 2, therefore, it is judged as a face.

On the other hand, since a pair of unit area groups, i.e., a set of hair area group HR2 and skin color area group FC2 is not in contact with any areas and does not satisfy the condition of rule 2, it is excluded from being judged as a face area.

With this arrangement, the tracking signal processing circuit 45 terminates the face extracting process and returns to the main routine of FIG. 27 from step SP36.

Then, the tracking signal processing circuit 45 proceeds to step SP23 in the main routine of FIG. 27 and obtains Area Face determined at step SP22 as "hair area+skin color area".

With this arrangement, the tracking signal processing circuit 45 detects an area of face area on the frame number FN=1, and proceeds to step SP24 and obtains the standard face area Area Std corresponding to the shot mode selected presently from the face area table.

Here, the face area table is set to the standard area Area Std=400 and 100 when the up-shot mode is selected, Area Std=100 and 25 when the bust shot mode is selected, and Area Std=25 and 7 when the full shot is selected, according to 2 kinds of screen dividing method, i.e., on 32×32 blocks and 16×16 blocks.

Then, the tracking signal processing circuit 45 proceeds to step SP25 and compares the Area Std with the detected face area of the target and supplies tracking control signal S25 to the zooming driving motor 42 in order that the difference becomes 0.

At this point, the control signal by the tracking control signal S25 is determined based on the method of screen dividing as rules 1 and 2.

The rule 1 applies to the case where the screen is divided into 16×16 blocks and the control signal is obtained by quadrupling the difference value between the Area Face and the Area Std as "(Area Face−Area Std)×4".

On the other hand, the rule 2 designates the control signal in the case where the screen is divided into 32×32 blocks and Control Signal is defined as "If screen divided=32×32, Control Signal=(Area Face−Area Std)".

Then, the tracking signal processing circuit 45 terminates the zooming processing on the frame number FN=1 and returns to step SP22 described above and repeats the zooming processing on the next frame FN=FN+1.

When the tracking signal processing circuit 45 repeats the zooming processing, the zooming driving motor 42 zoom controls a lens 3s 32 of lens block unit 31 in order that the present value of detected face becomes approximately the same value as the Area Std obtained from the face area table at step SP24 and thus, the size of face image to be projected on the display plane PIC will be maintained equivalent to the standard face area Area Std.

According to the foregoing construction, in the case where the face model as a target approaches closer to the camera or moves away from the camera, the lens 32 of the lens block can be zoom-controlled in order to project a face image always having a same size on the display screen PIC, and with this arrangement, the method, such as a distance sensor utilized in a single lens reflex camera, becomes unnecessary, and thus, a video camera system with a simpler construction can be obtained.

Furthermore, the embodiment described above has dealt with the case of zooming processing the lens 32 of lens block unit 31 optically by the zooming driving motor 42 as a zooming method. However, the zooming method is not only limited to this, but also the same effects as those of the above case can be obtained if the zooming processing will be performed by practically obtaining the images enlarged or reduced and by inputting digital video signal obtained based on video signal S31 to be obtained from the charge coupled device 34 of the lens block unit 31 to the frame memory and reading out the frame memory corresponding to the tracking control circuit 45, for example.

While the invention has been described in connection with the preferred embodiments of the invention, it will be obvious to those skilled in the art that various changes and modifications may be made, therefore, it is the object to cover, in the appended claims all such changes and modifications as fall within the true spirit and scope of the invention.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A video signal tracking method comprising:

an input image forming step for forming image data of an input image expressing basic model of a video signal:

a target area extracting step for extracting a target area from said image data of input image, said image data being divided into a plurality of unit areas, and a first color area prospective and a second color area prospective, wherein said target area extracting step includes absorbing discontinuous areas when extracting said first color area prospective and said second color area prospective;

a detecting target size calculating step for calculating the size of said extracted target area;

a deviation detecting step for obtaining the deviation between the size of a detecting target obtained in a reference detecting target size calculating step and the size of a reference target obtained in said reference target size memory step; and an input image zooming step for zooming the size of input image formed onto said input image forming step corresponding to the deviation output of said deviation detecting step, in order that said deviation become nearly 0, wherein the image data of the input image the sizes of which are corresponding to up-shot, bust shot and/or full body shot as said target model is formed in said input image forming step.

2. A video signal tracking method according to claim 1, wherein;

said target area includes a first color area and a skin color area.

3. A video signal tracking method according to claim 2, wherein;

the reference size of the target of selected shot is drawn out from target size table which is provided corresponding to said plurality of the steps, and then is calculated it.

4. A video signal tracking method according to claim 3 wherein;

said reference target size is compared with detected present object size, and zooming means is controlled so that the difference obtained from comparing result becomes nearly 0.

5. A video signal tracking method according to claim 4, wherein;

when absorbing said discontinuous areas the image information of designated unit area is absorbed with a first color prospective unit area, if there is said first color prospective area being contiguous to an unit area centering around said each area.

6. A video signal tracking method according to claim 4, wherein;

when absorbing said discontinuous areas, the image information of designated unit area is absorbed with a second color prospective unit area, if there is said second color prospective area being contiguous to an unit area with centering around said each unit area.

7. A video signal tracking method according to claim 4, wherein;

when extracting said first color prospective area and said second prospective color area, discontinuous areas are absorbed each other, and then a first color area and a second color area are combining.

8. A video signal tracking method according to claim 7, wherein;

when combining first color area and second color area, the image information of designated area is combined with a first group of color unit area, if there is a first color unit area being contiguous to an unit area centering around said each area.

9. A video signal tracking method according to claim 8, wherein;

when combining first color area and second color area, the image information of the designated unit area and an image information of an unit area being contiguous to second prospective color unit area are combined with said second prospective unit area, if there is said second color prospective unit area being contiguous to the designated unit area.

10. A video signal tracking method according to claim 7, wherein;

the size of first color area and second color area are further calculated.

11. A video signal tracking method according to claim 10, wherein;

said first color is determined hair color, and said second color is determined skin color.

12. A video camera system comprising:

a group of lenses for focusing lights from an object;

an imaging element for converting the lights from said lens group into an electric signal;

an analog-to-digital converter for converting an analog imaging signal from said imaging element into a digital signal;

input image forming means for forming an image data of an input picture expressing a basic model of the object analog-digital converted;

target area extracting means for extracting a target area from said image data of input image, said image data being divided into a plurality of unit areas, and a first color area prospective and a second color area prospective are extracted, such that when extracting said first color area prospective and said second color area prospective discontinuous areas are absorbed;

detecting target size calculating means for calculating the size of said extracted target area;

difference detecting means for obtaining difference between the size of reference target obtained from a reference target size memory means and the size of detecting target obtained from reference detecting target size calculating means; and input image zooming means for zooming the size of input image formed onto said input image forming means corresponding to the difference output of said difference detecting means so that said difference becomes nearly 0, wherein said input image forming means selectively forms the input image data the size of which is corresponding to up-shot, bust shot and/or full body shot as said target model.

13. A video camera system according to claim 12, wherein;

said target area includes a first color area and a skin color area.

14. A video camera system according to claim 13, wherein:

the reference size of the target of selected shot is drawn out from target size table which is provided corresponding to said plurality of the shots, and then is calculated.

15. A video camera system according to claim 14, wherein;

said reference target size is compared with detected the present object size, and zooming means is controlled, so that the difference obtained from comparing result becomes nearly 0.

16. A video camera system according to claim 15, wherein;

when absorbing discontinuous areas, the image information of designated unit area is absorbed with a first color prospective unit area, if there is said first color prospective area being contiguous to an unit area centering around said each area.

17. A video camera system according to claim 15, wherein;

when absorbing said discontinuous areas, the image information of designated unit area is absorbed with a second color prospective unit area, if there is said second color prospective area being contiguous to an unit area centering around said each unit area.

18. A video camera system according to claim 15, wherein;

when extracting said first color prospective area and said second prospective color area, discontinuous areas is absorbed, and then a first color area and a second color area are combined.

19. A video camera system according to claim 18, wherein;

when combining first color area and second color area, the image information of designated area is combined with a first group of color unit area, if there is a first color unit area being contiguous to an unit area centering around said each area.

20. A video camera system according to claim 19, wherein;

when combining said first color area and second color area, the image information of the neighboring area having the image information of the designated unit area and an image information of an unit area being contiguous to second prospective unit area combined with said second prospective color small area, if there is a second color prospective unit area being contiguous to the designated unit area.

21. A video camera system according to claim 19, wherein;

the size of first color area and second color area combined each other are further calculated.

22. A video camera system according to claim 21, wherein;

said first color is determined hair color, and said second color is determined skin color.

* * * * *